(12) United States Patent
Diehl et al.

(10) Patent No.: US 11,773,893 B2
(45) Date of Patent: Oct. 3, 2023

(54) METHOD OF JOINING TWO COMPONENTS, AUXILIARY JOINING PART AND COMPONENTS ASSEMBLY

(71) Applicant: PROFIL Verbindungstechnik GmbH & Co. KG, Friedrichsdorf (DE)

(72) Inventors: Oliver Diehl, Usingen (DE); Andreas Lembach, Darmstadt (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 44 days.

(21) Appl. No.: 17/160,372

(22) Filed: Jan. 28, 2021

(65) Prior Publication Data

US 2021/0148397 A1    May 20, 2021

Related U.S. Application Data

(62) Division of application No. 16/044,615, filed on Jul. 25, 2018, now Pat. No. 10,962,042.

(30) Foreign Application Priority Data

Aug. 3, 2017  (DE) .......................... 102017117644.6
Jul. 18, 2018  (DE) .......................... 102018117387.3

(51) Int. Cl.
*B29C 65/60*  (2006.01)
*F16B 37/06*  (2006.01)
(Continued)

(52) U.S. Cl.
CPC .......... *F16B 37/065* (2013.01); *B21J 15/022* (2013.01); *B21J 15/025* (2013.01); *B21J 15/147* (2013.01);
(Continued)

(58) Field of Classification Search
CPC ........ F16B 37/065; F16B 5/04; F16B 17/008; F16B 19/05; F16B 19/06; F16B 37/068;
(Continued)

(56) References Cited

U.S. PATENT DOCUMENTS 2,593,506 A    4/1952  Wales
2008/0056842 A1  3/2008  Stevenson et al.

FOREIGN PATENT DOCUMENTS

DE    3440519 A1    5/1985
DE    19701252 A1 *  7/1998  .............. F16B 19/10
(Continued)

OTHER PUBLICATIONS

English translation of DE19701252 (Year: 1998).*
(Continued)

*Primary Examiner* — Jun S Yoo
(74) *Attorney, Agent, or Firm* — Dickinson Wright PLLC

(57) ABSTRACT

A method of connecting a first component and a second component with the aid of an auxiliary joining part, wherein the auxiliary joining part is formed from a pin and a plate. A position of intended fracture is present between the plate and the pin. The first component, the second component and the auxiliary joining part are brought into a stacked arrangement such that the plate contacts the first component and the pin projects away from the side of the plate remote from the first component. A force is exerted on the pin of the auxiliary joining part in the direction towards the stacked components which leads to a fracture at a position of intended fracture and the pin is used in order to pierce slugs from the stacked components. The end of the pin which is pressed through the second component, and/or a washer which is optionally provided there, is deformed in order to provide a form-
(Continued)

Figure 1:
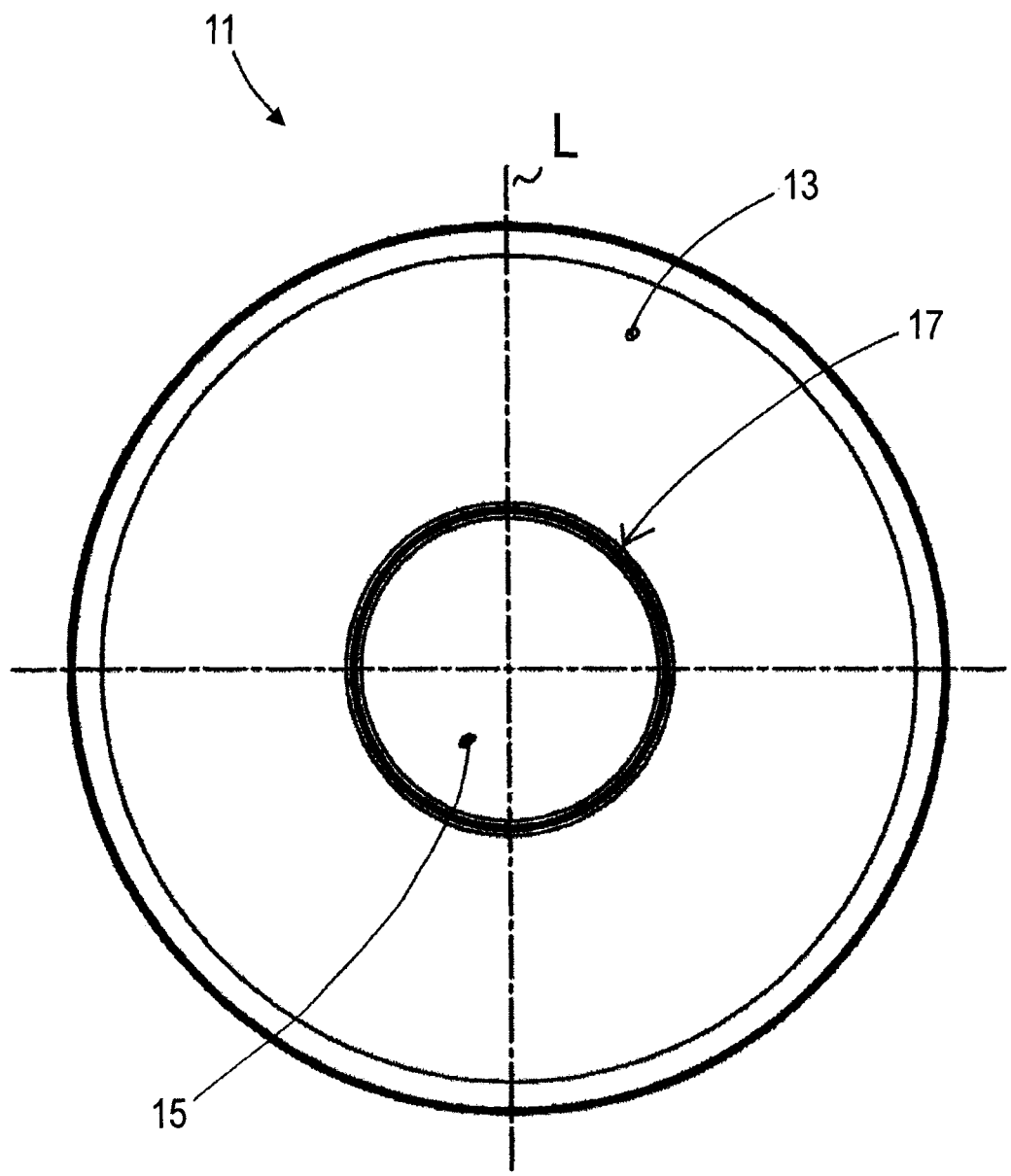

locked connection to the second component or to a washer which is provided there. Furthermore, an auxiliary joining part is claimed.

8 Claims, 21 Drawing Sheets

(51) Int. Cl.
  *B21J 15/02* (2006.01)
  *B21J 15/14* (2006.01)
  *F16B 17/00* (2006.01)
  *F16B 5/04* (2006.01)
  *F16B 19/05* (2006.01)
  *F16B 19/06* (2006.01)

(52) U.S. Cl.
  CPC .............. *F16B 5/04* (2013.01); *F16B 17/008* (2013.01); *F16B 19/05* (2013.01); *F16B 19/06* (2013.01); *B29C 65/602* (2013.01); *Y10T 29/49826* (2015.01); *Y10T 29/49835* (2015.01); *Y10T 29/49906* (2015.01); *Y10T 29/49908* (2015.01); *Y10T 29/49947* (2015.01); *Y10T 29/49948* (2015.01); *Y10T 29/49954* (2015.01); *Y10T 29/49959* (2015.01); *Y10T 29/49966* (2015.01)

(58) Field of Classification Search
  CPC ...... B21J 15/022; B21J 15/025; B21J 15/147; B29C 65/602; B29C 65/562; B29C 65/64; B29C 66/1122; B29C 66/21; B29C 66/41; B29C 66/721; B29C 66/8161; B29C 66/8167; B29C 66/8242; B29C 66/8322; B29C 66/7212; B29C 66/7392; B29C 66/7394; B29C 65/601; Y10T 29/49826; Y10T 29/49835; Y10T 29/49906; Y10T 29/49908; Y10T 29/49947; Y10T 29/49948; Y10T 29/49954; Y10T 29/49959; Y10T 29/49966; Y10T 29/49956
  See application file for complete search history.

(56) References Cited

FOREIGN PATENT DOCUMENTS

| | | | |
|---|---|---|---|
| DE | 102010000500 A1 * | 8/2011 | ............ B21J 15/022 |
| DE | 102014113438 A1 | 5/2015 | |
| EP | 2873473 A1 | 5/2015 | |
| WO | 2018055210 A1 | 3/2018 | |

OTHER PUBLICATIONS

European Search Report for European Application No. 18185762.4 dated Dec. 5, 2018, 3 pages.

Official Communication from the German Patent Office for related German Application No. 102017117644.6, dated May 23, 2018, 8 pages.

* cited by examiner

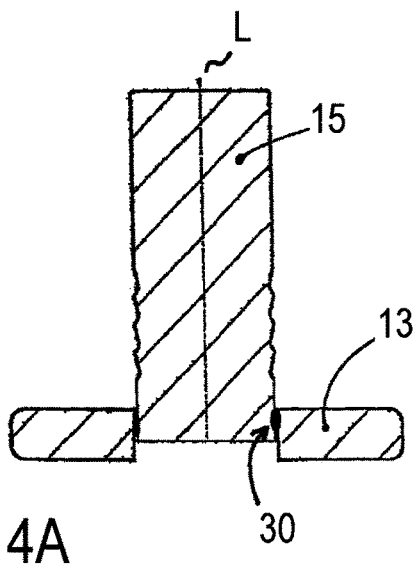
Fig. 4A
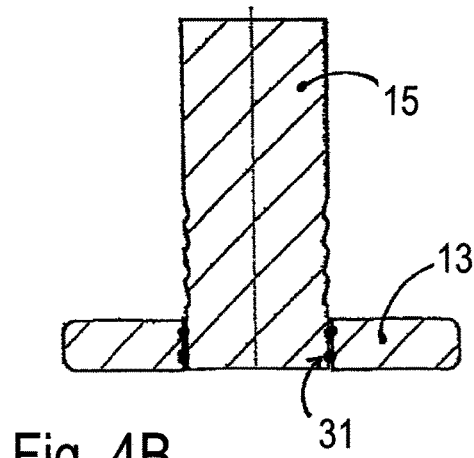
Fig. 4B
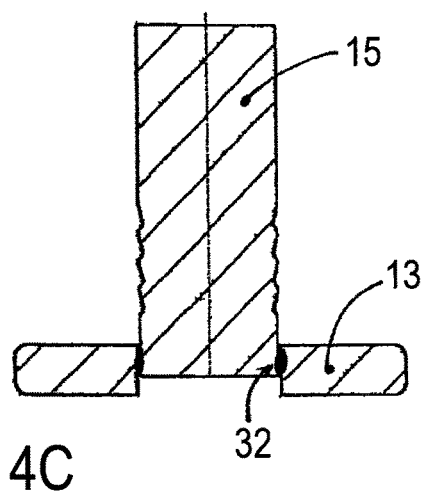
Fig. 4C
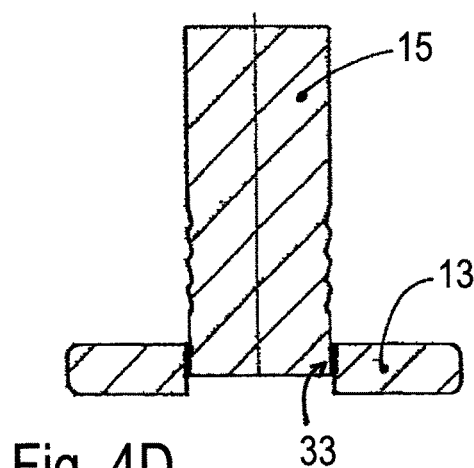
Fig. 4D
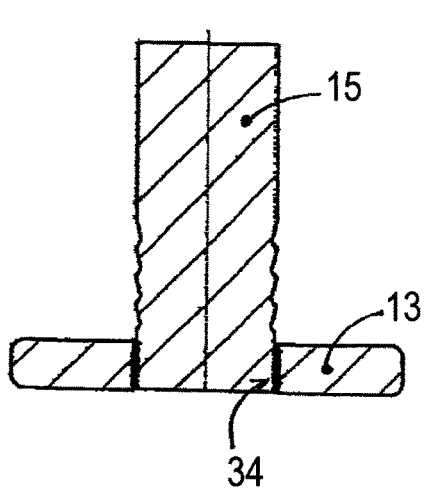
Fig. 4E.1
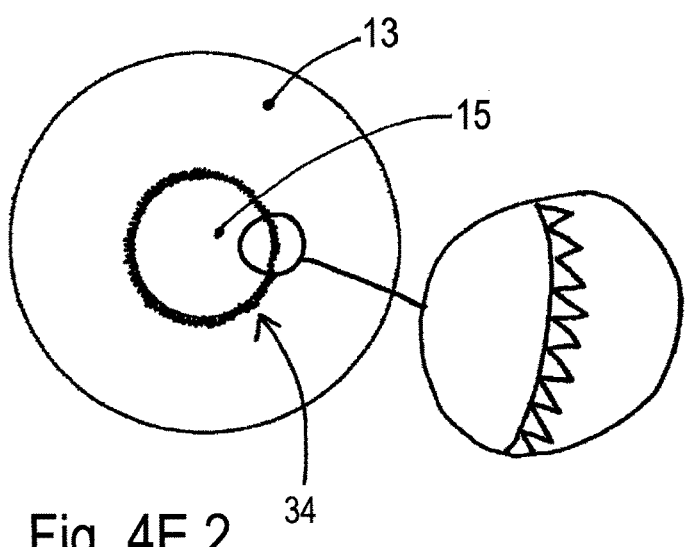
Fig. 4E.2

METHOD OF JOINING TWO COMPONENTS, AUXILIARY JOINING PART AND COMPONENTS ASSEMBLY

CROSS REFERENCE TO RELATED APPLICATION

This divisional application claims priority to U.S. application Ser. No. 16/044,615, filed Jul. 25, 2018, which is incorporated herein by reference in its entirety.

The present invention relates to a method for the joining of a first component and a second component with the aid of an auxiliary joining part, wherein the auxiliary joining part is formed of a pin and a plate and also to an auxiliary joining part and to a component assembly manufactured by the method. The components can be sheet metal parts and/or organic sheet parts.

Organic sheet parts are components which as a result of their planar or three-dimensional shape resemble sheet metal parts and can at least in part be handled in the same way as these, but which consist of a non-metallic composite material such as a fiber or fabric reinforced plastic. Such composite materials generally have high strength fibers such as, for example, aramid fibers, carbon fibers or glass fibers which are embedded either as relatively short filling fibers or as long filaments, or in the form of a fabric manufactured from filaments, into a matrix material of plastic. Thermoplastic materials can indeed be used as the plastic for coachwork components; however, duroplastics are usually used. Organic sheet parts are finding increasing use in the construction of coachwork and in other fields of technology, as a result of their characteristics such as light-weight, high mechanical load carrying ability and good formability.

One problem in connecting two organic sheet parts, or an organic sheet part to a sheet metal part, lies in fact that some of the established joining processes, such as for example punch riveting, are not suitable for fiber or fabric reinforced plastics.

A method of the initially named kind and also a component assembly formed from the joined components, is already known from DE 10 2014 113 438 A1 and/or from the corresponding EP-A-2873473 which is suitable for joining areal components, in particular when one of the components is formed as an organic sheet part. The areal components can be planar components or have a three-dimensional shape. The known punch riveting process can be used with a plurality of individual components which are laid on top of one another, with the components being present in the form of at least two metallic sheet metal parts, or of at least two organic sheet parts, i.e. plastic components with fiber or fabric reinforcement, or of at least one metallic component and at least one organic component.

The need exists to enable a simple and effective joining of sheet parts of which at least one can be an organic sheet part. Furthermore, an economical method should be presented which requires only a small number of individual components and which facilitates the handling of the individual components.

In accordance with claim 1 a method of joining a first component and a second component with the aid of an auxiliary joining part is provided, with the auxiliary joining part consisting of a pin and a plate, with the special characterizing feature that a position of intended fracture is present between the plate and the pin, wherein (i) the first component, the second component and the auxiliary joining part are brought into a stacked arrangement such that the plate contacts the first component and the pin projects away from the side of the plate remote from the first component, (ii) a force is exerted on the pin of the auxiliary joining part in the direction towards the stacked components which leads to a fracture at a position of intended fracture and the pin is used in order to pierce slugs from the stacked components, (iii) the end of the pin which is pressed through the second component, and/or a washer which is optionally provided there is deformed in order to provide a form-locked connection to the second component or to a washer which is provided there and (iv) the plate and/or the end of the pin which was originally remote from the plate, but is now adjacent to it, is deformed in order to also produce a form-fitted connection there.

The auxiliary joining part which is used is characterized in that it consists of a pin and of a plate provided at the pin, with a position of intended fracture being present between the plate and the pin.

The auxiliary joining part is thus used in a similar manner to a so-called solid punch rivet. As a result of the auxiliary joining part which consists of a pin and a plate and has no loose individual components, it is not only possible to achieve a simple and efficient connection of the sheet parts. In addition, as a result of the connection between the plate and the pin of the auxiliary joining part, handling difficulties are avoided because instead of having to operate with two loose parts which have to be separately handled and held, only the auxiliary joining part has to be positioned on the sheet parts. The entire system thus consists in the ideal case of a first and a second component, an auxiliary joining part and optionally a washer having a hole, to the extent that the component remote from the plate is not a metallic component which can be directly connected to the adjacent end of the pin.

In accordance with the invention the auxiliary joining part is positioned on the sheet metal parts in such a way that the plate contacts the first component, which can be a metallic sheet metal part or an organic sheet part and the pin projects away from the side of the plate remote from the first component. Thereafter a force is exerted on the pin whereby the position of intended fracture is broken and the pin is subsequently used to punch slugs from the stacked components.

The pin is pressed through to such an extent that it passes through the components that are present to the extent that a form-fitted connection can be produced with the two ends of the pin as is described in detail in the above-named EP document (EP-A2873473). In this connection a form-fitted connection is made between the one end of the pin which was originally remote from the plate with the plate, while the other end of the pin which was originally arranged adjacent the plate is brought into a form-fitted connection with the component remote from the plate (provided this consists of a metal) or with a washer provided there (in case the component remote from the plate is an organic sheet part). In this connection there are basically two possibilities of forming the two form-fitted connections with the ends of the pin. On the one hand a metallic material of the sheet metal part or a washer can be formed into respective undercuts of the pin, on the other hand the ends of the pin can be so embossed that the required shape fitted connection with the plate and with the component remote from the plate, or the washer provided there, arises.

Further developments of the invention can be found in the dependent claims, in the description and also the accompanying drawings.

In general, the method claimed here applies to areal components which have a planar shape or a three-dimensional shape and are present in the form of at least two metallic sheet metal parts or of at least two organic sheet parts, i.e. plastic components with a fiber or fabric reinforcement or in the form of at least one metallic component and at least one organic component.

At least during the step (ii), i.e. the punching through of the stacked arrangement of the components, the first component is clamped to the second component and optionally to the washer. This ensures that any organic sheet parts can be cleanly punched through by means of the pin without the hole edge of any organic sheet part that is present and which is produced during the punching being frayed out.

In this way it can be ensured that the punch rivet process can be carried out without problems. Through the fixed preloading or clamping of the first and second component faulty positioning or a slippage of one of the two plates during the punch rivet process is avoided. Furthermore, a rotationally secure connection is produced between the components because of the frictional connection that is generated.

The position of intended fracture between the plate and the pin thus forms a weakened position which allows the plate and the pin to be transported and handled as a unit, but which however makes it possible, on the operation of a corresponding force, to enable a movement of the pin relative to the plate.

Through the position of intended fracture, it is not only ensured that the plate can be separated from the pin but also the local partition line is preset.

In accordance with a special design, the plate of the auxiliary joining part is in particular made circular. Through the circular design the handling is, on the one hand, facilitated because the auxiliary joining part does not have to be aligned around the middle longitudinal axis with regard to the geometrical form. Also, the ability to manufacture the plate and the complete auxiliary joining part is simplified through the circular design, since the plate can be present as a simple metallic disc.

A further special design envisages that the pin is in particular of cylindrical or prismatic shape in cross-section. In this way a simple manufacture of the auxiliary joining part is made possible. Furthermore, the piercing of the first and second sheet parts is facilitated by a cylindrical or prismatic design. With a prismatic design a certain additional security against rotation can be produced between the components.

As stated the auxiliary joining part which is to be used in accordance with the invention comprises a pin, a plate and a position of intended fracture. In this way the auxiliary joining part can be regarded as one component. The auxiliary joining part can be integrally manufactured, or made in one piece, for example by a cold heading process, or it can be manufactured from a pin and a plate manufactured separately from the pin. The pin can in this connection be soldered, welded, adhesively bonded, or joined to the plate by another method, in a shape fitted and/or force transmitting manner.

For the shape fitted connection of one end of the pin to the plate, and to the component remote from the plate, or to the washer, an undercut can be present at at least one end of the pin. Respective undercuts can also be provided at both ends of the pin.

In this connection the pin is so positioned that the undercut is surrounded at least partly by disc material or plate material. Furthermore, when using a sheet metal part, the undercut can be surrounded by the sheet metal part. By exerting an adequate pressure on the metallic disc or the plate of the auxiliary joining part, material of the disc or the plate is driven into the undercut and the auxiliary joining part is thereby joined to the metallic disc or the plate. A stable connection results as a result of the material driven into the undercut. The connection can be considered as a form fitted connection and a force transmitting connection.

It is however not essential to provide such undercuts since, as described in the above-named EP document (EP-A-2873473) the ends of the pin can be so embossed that the required shape fitted and force transmitting connection to the plate and to the component and/or to the washer remote from the plate arises.

Figure 2:
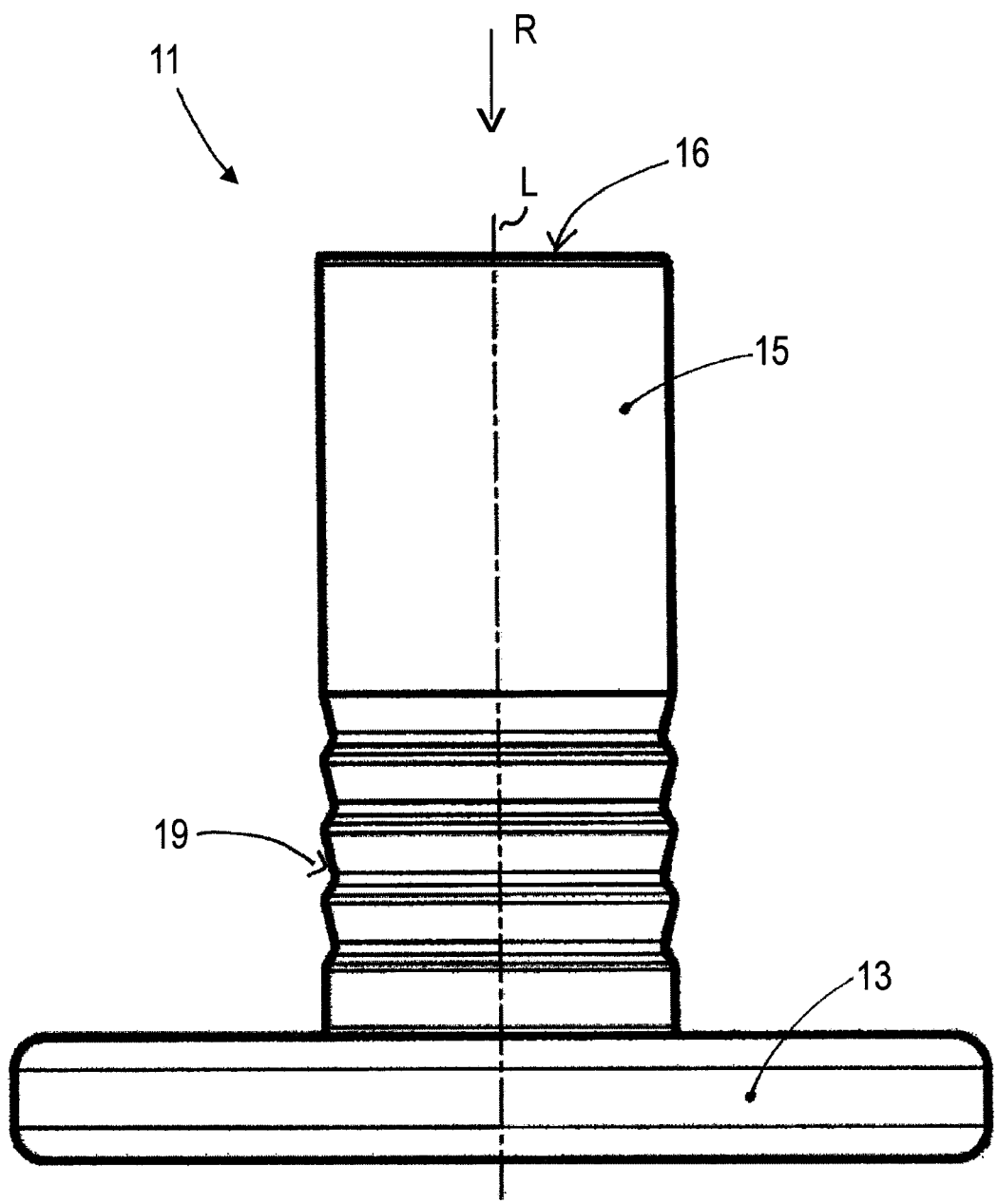
Figure 3:
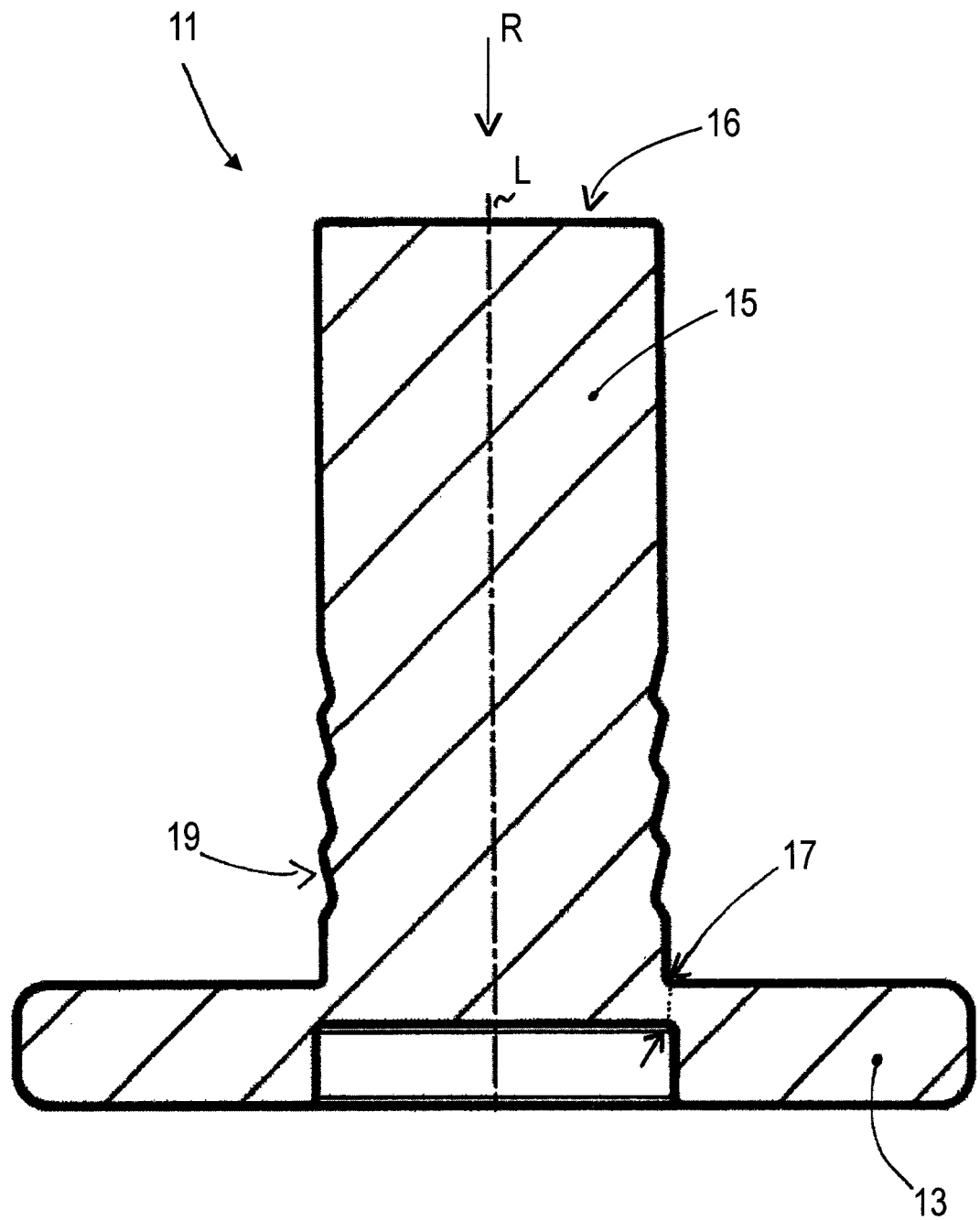
Figure 5:
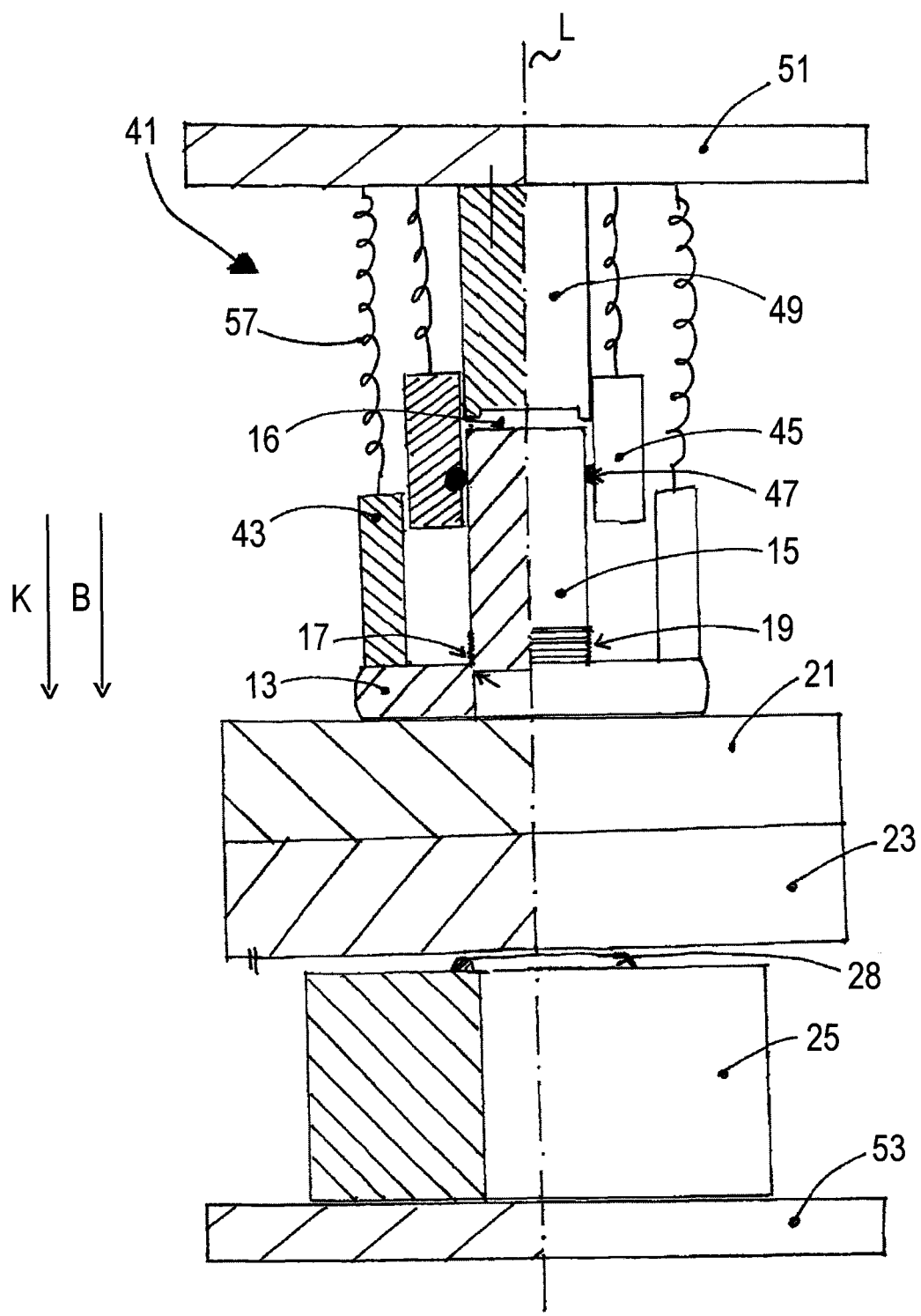
Figure 6:
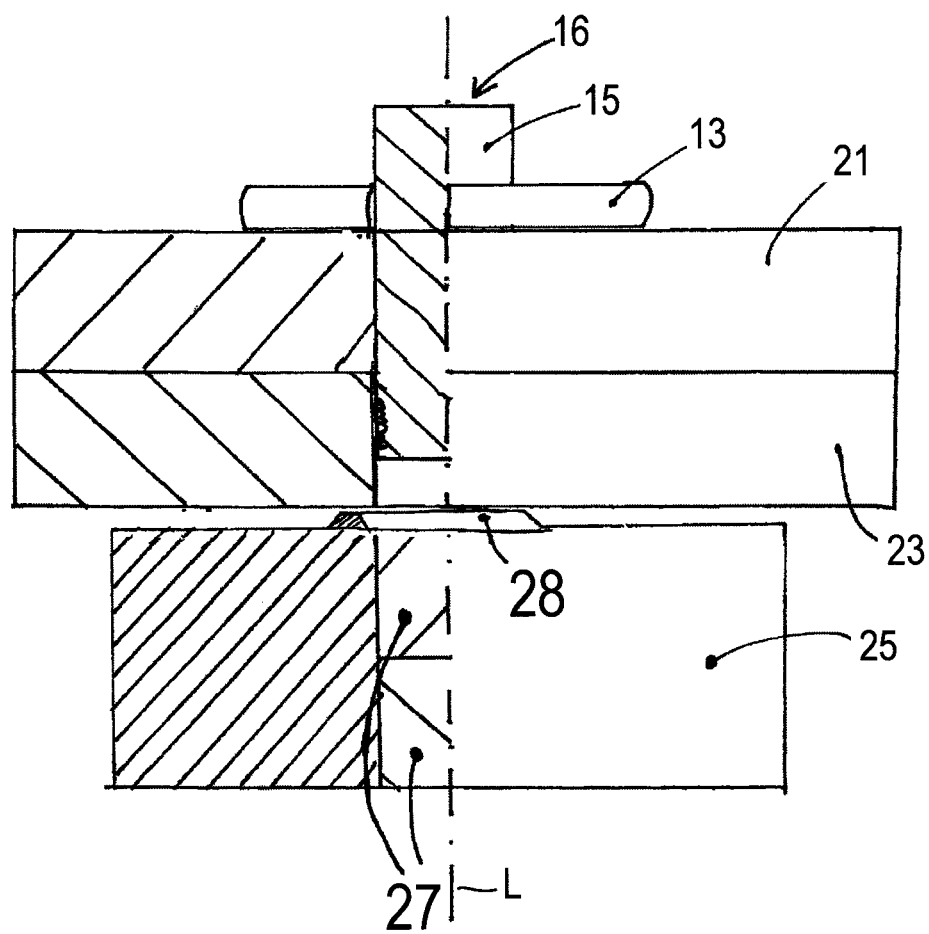
Figure 7:
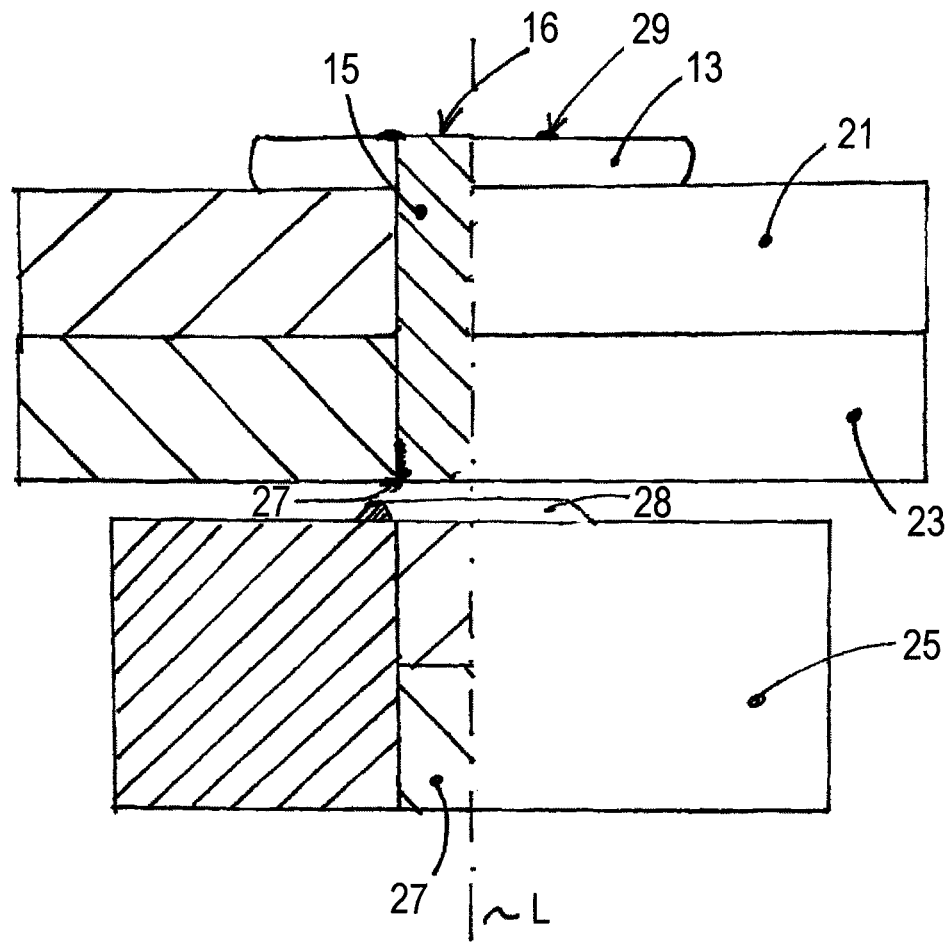
Figure 8A:
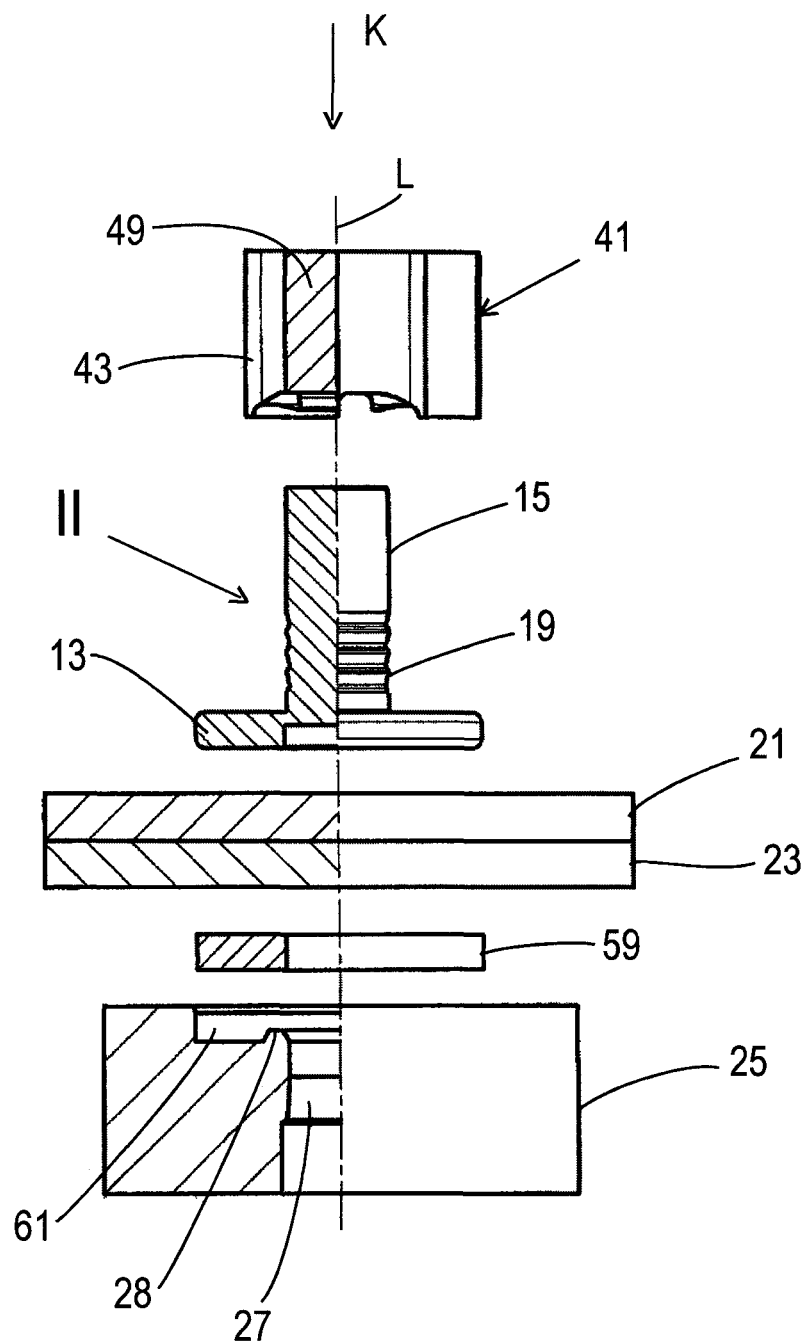
Figure 8B:
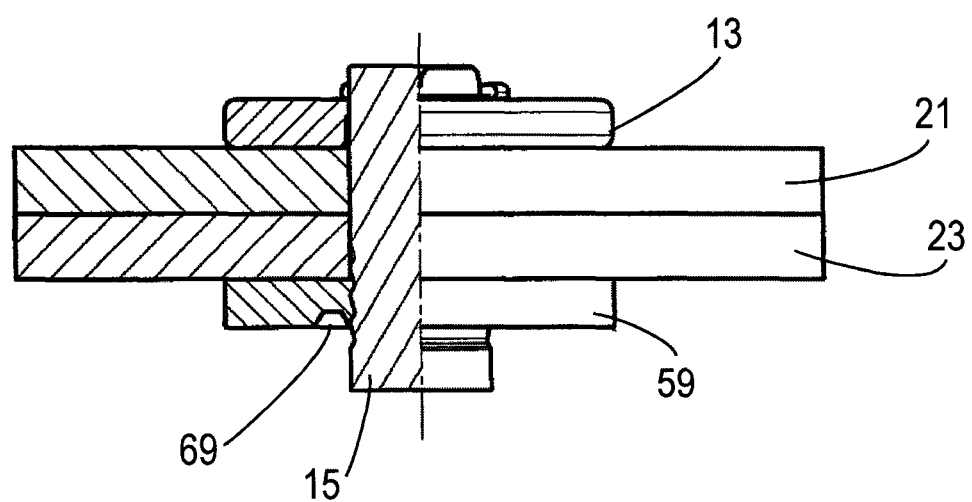
Figure 9A:
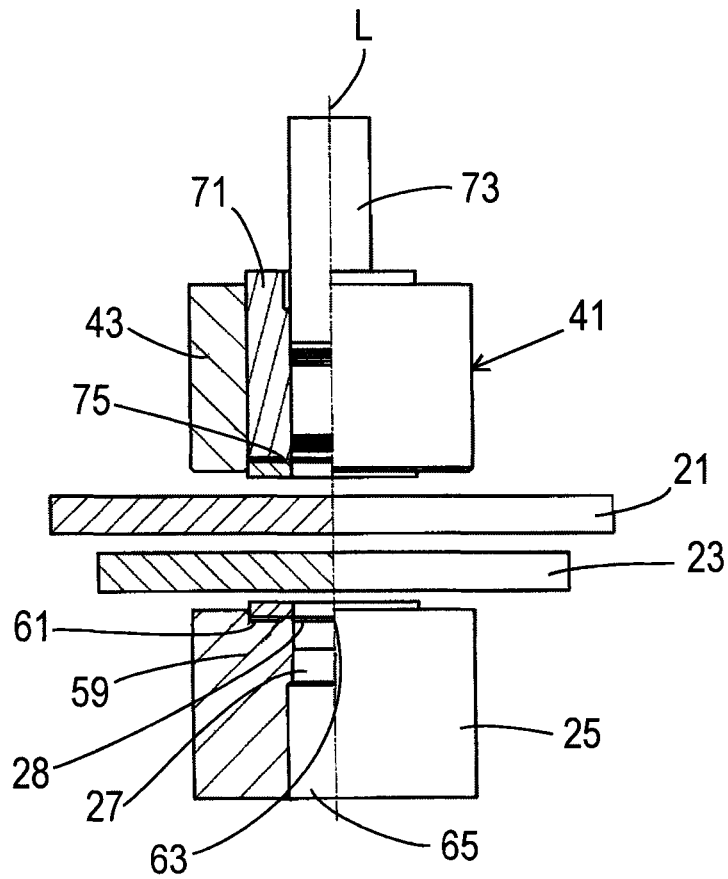
Figure 9B:
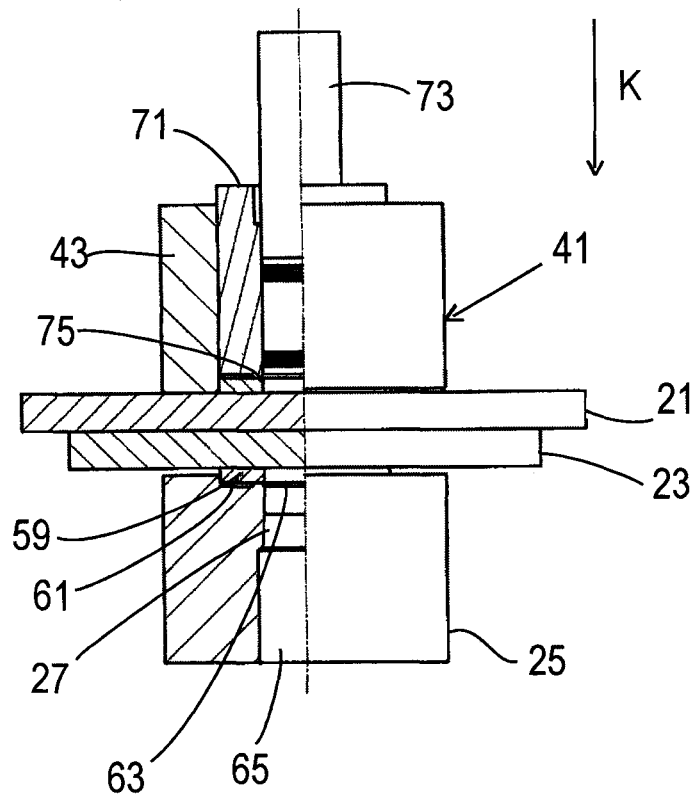
Figure 9C:
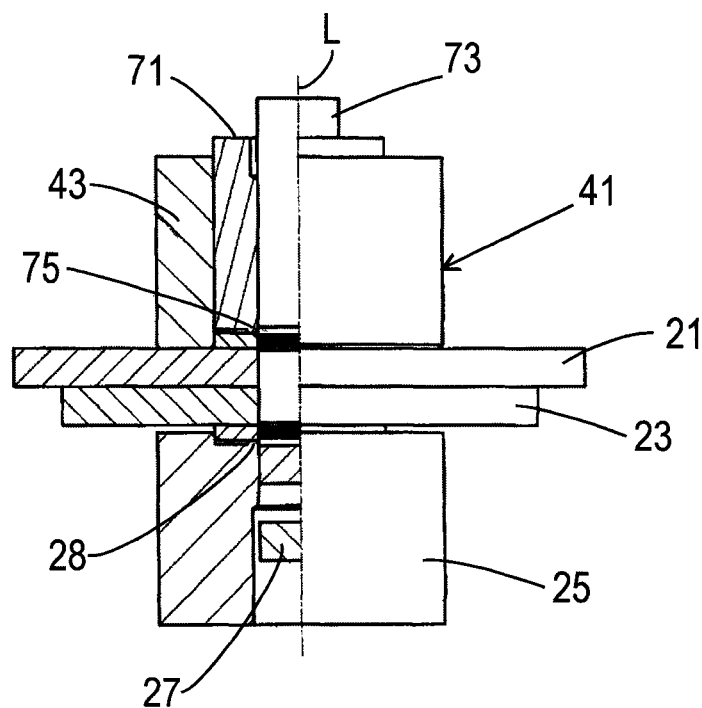
Figure 9D:
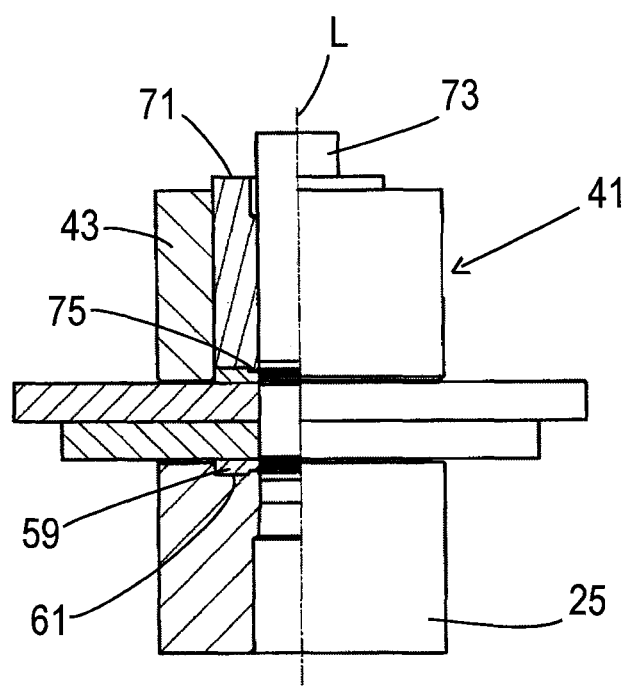
Figure 10A:
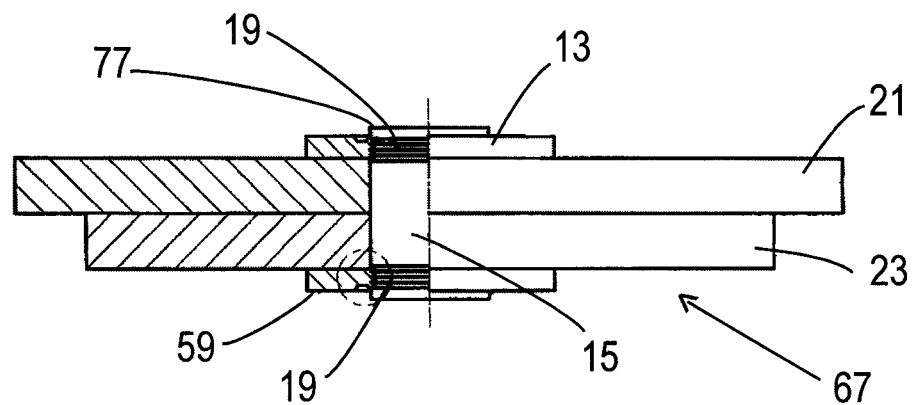
Figure 10B:
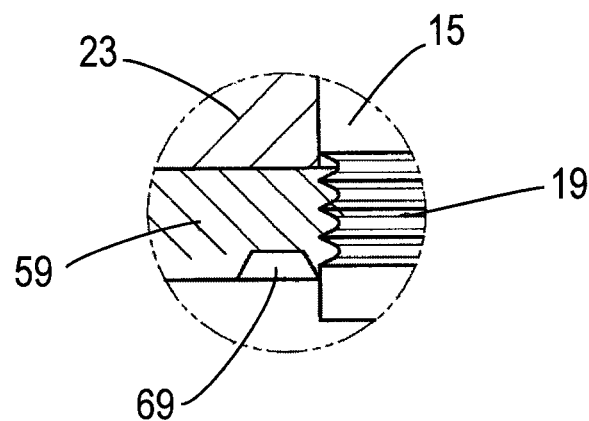
Figure 11:
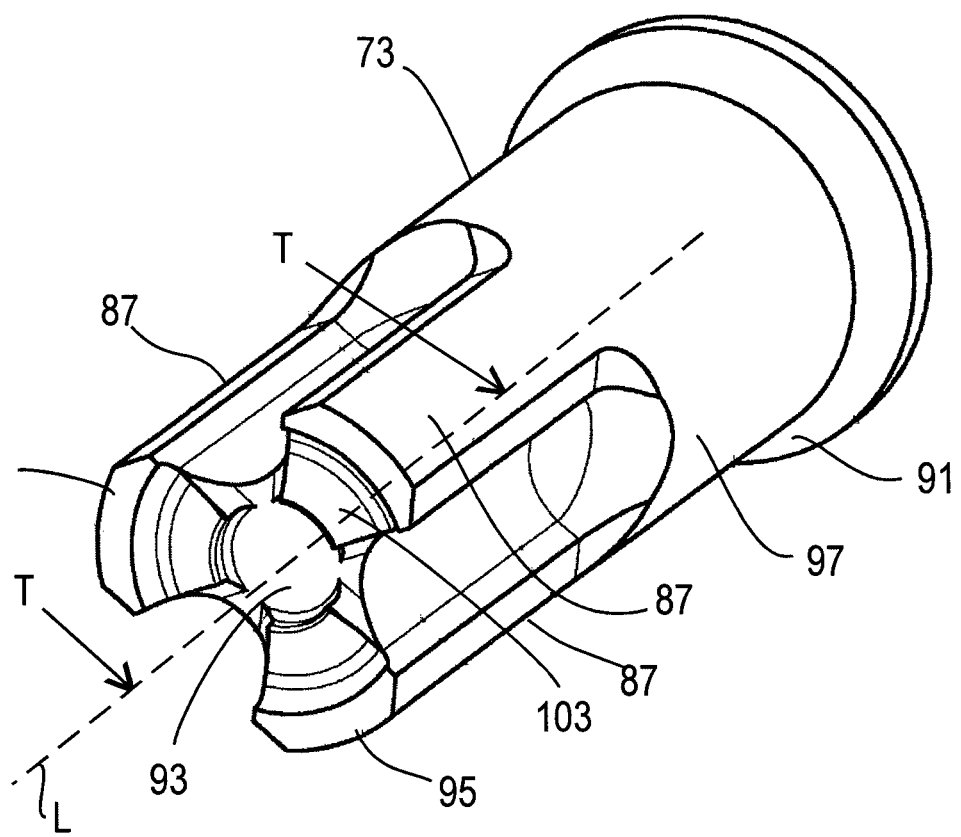
Figure 12:
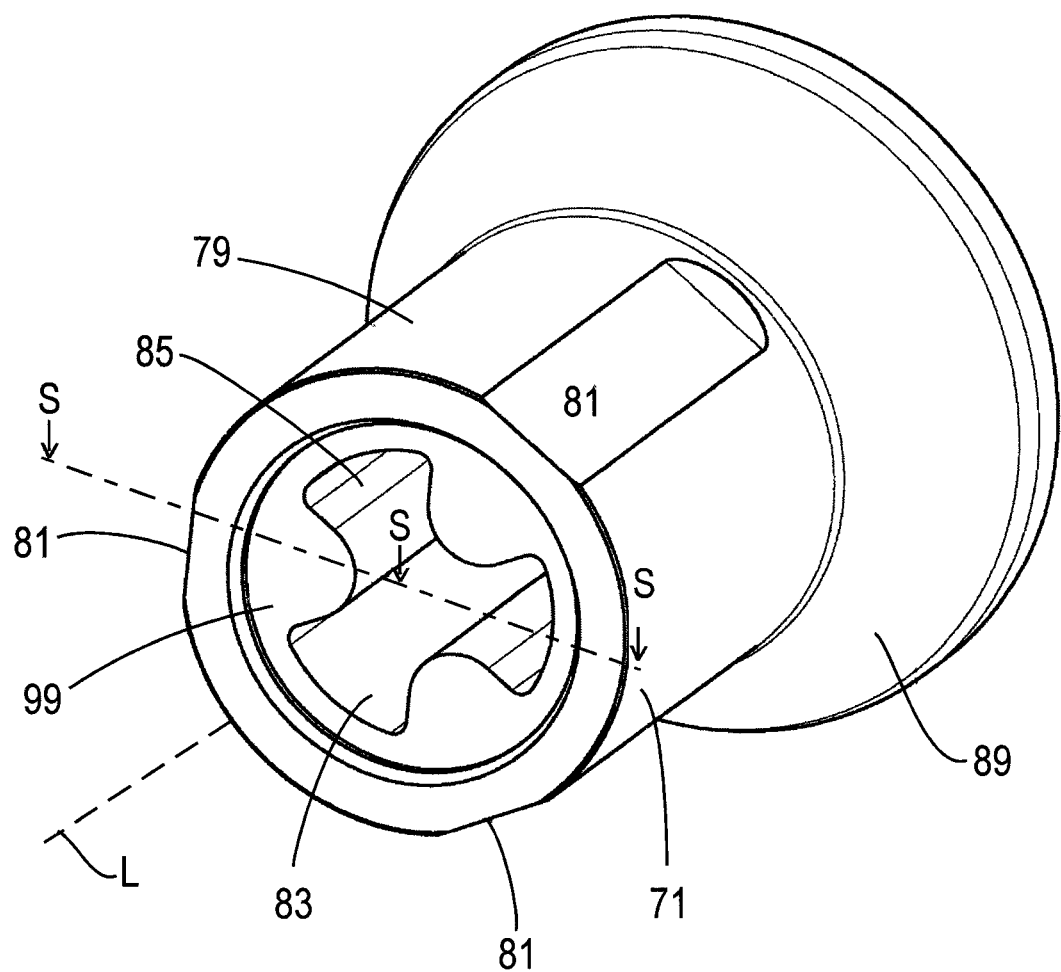
Figure 13A:
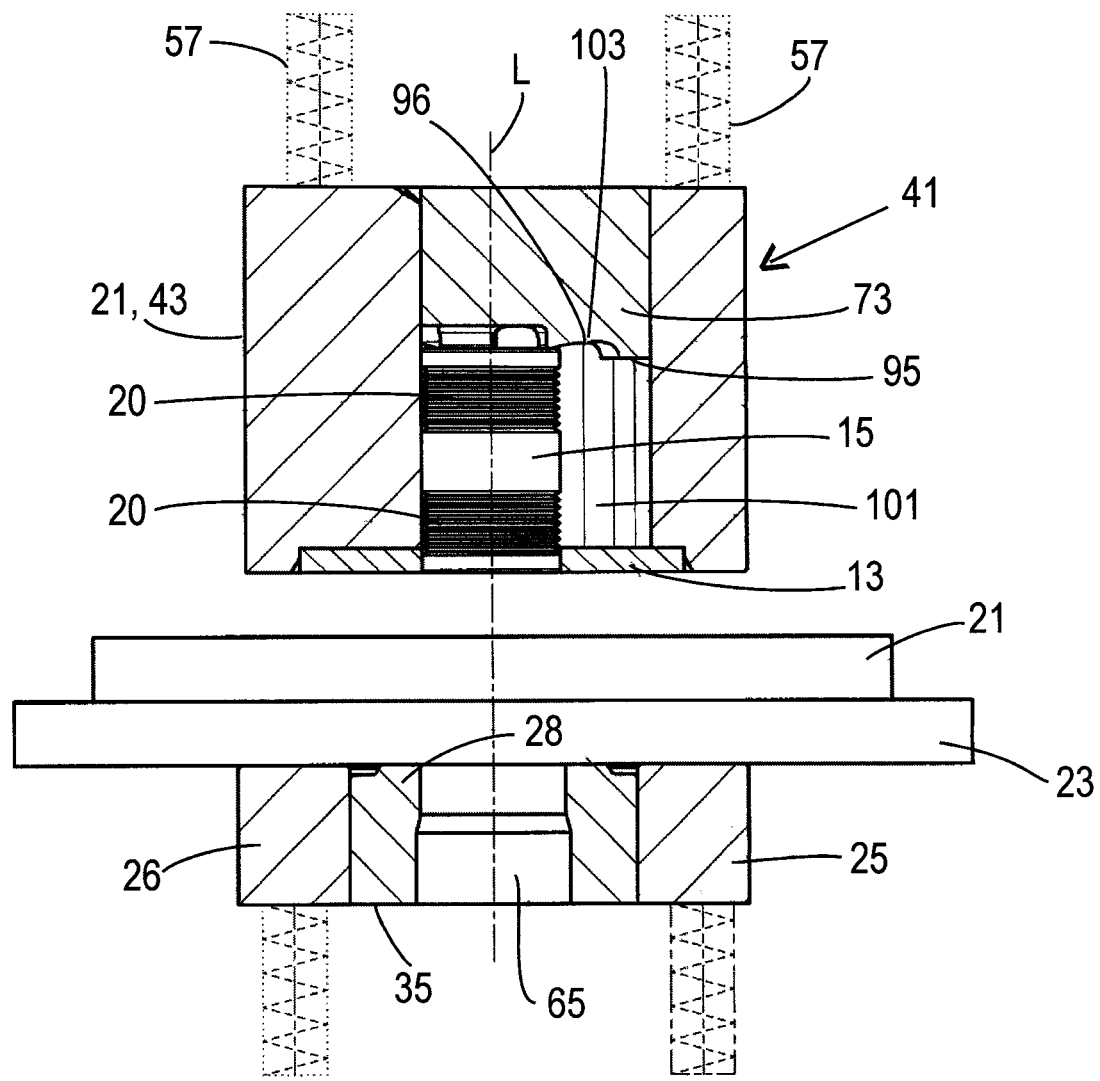
Figure 13B:
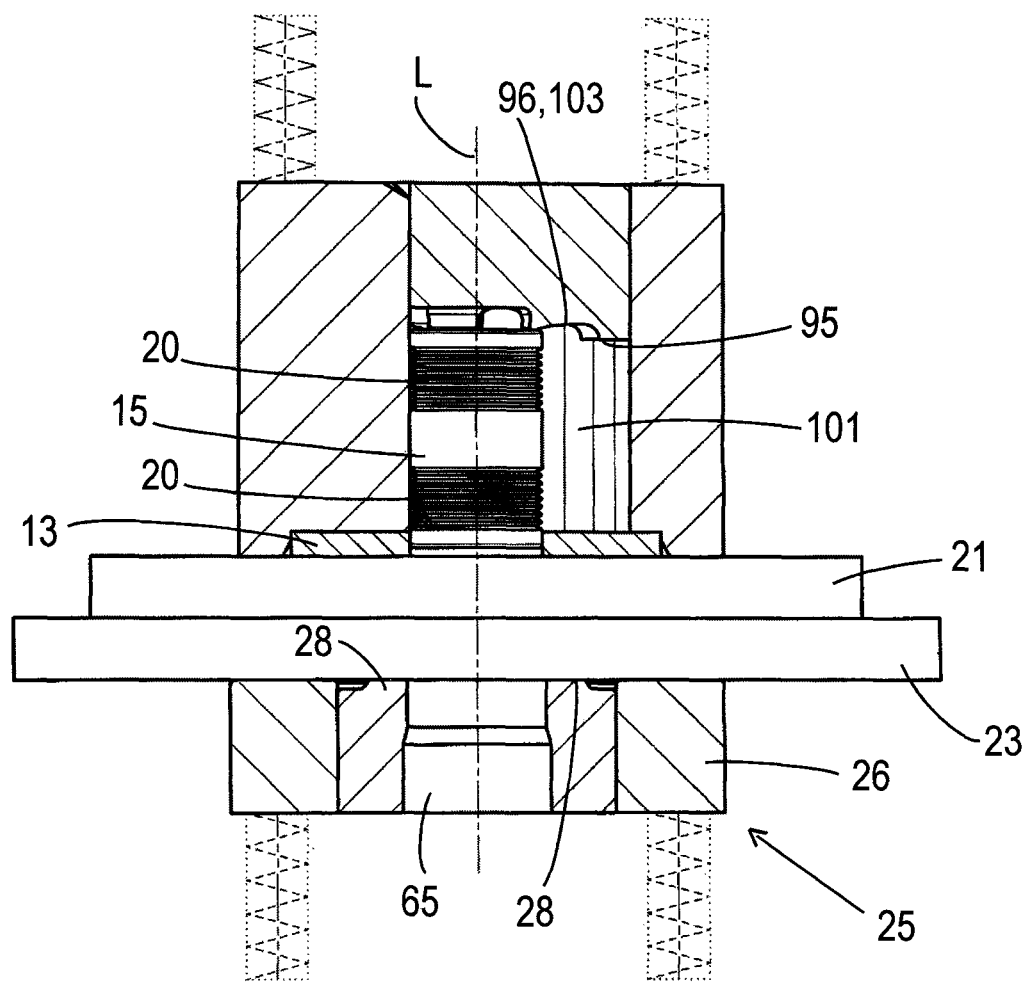
Figure 13C:
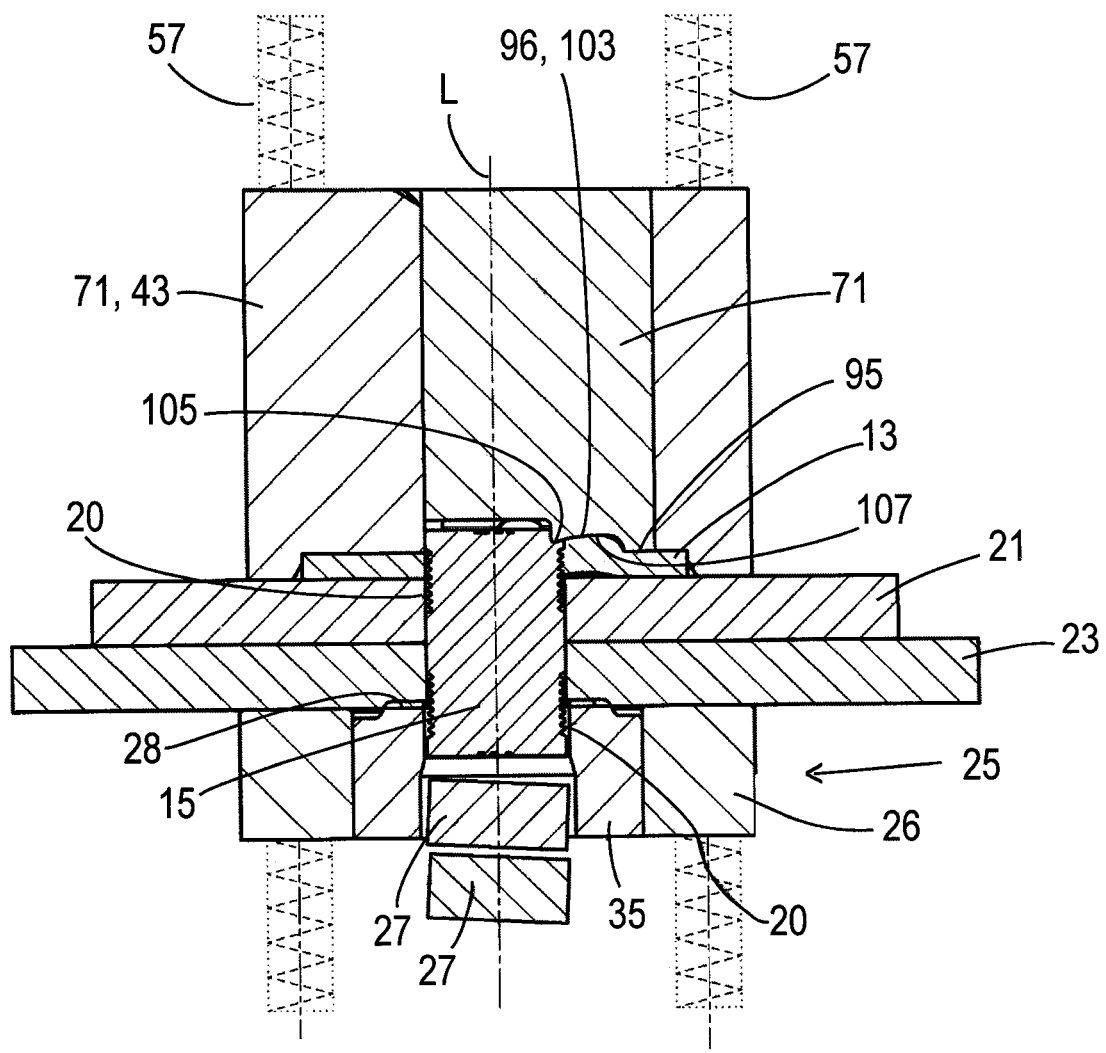
Figure 13D:
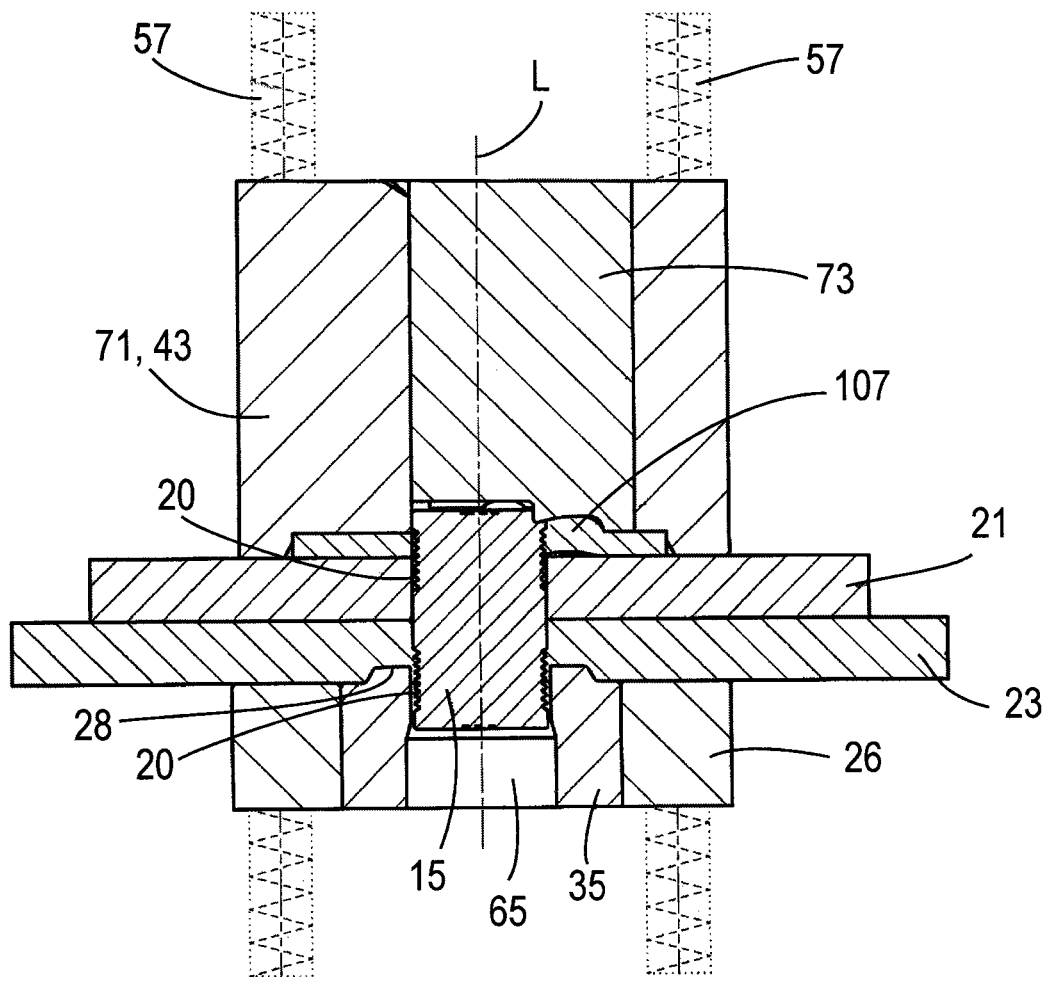
Figure 14A:
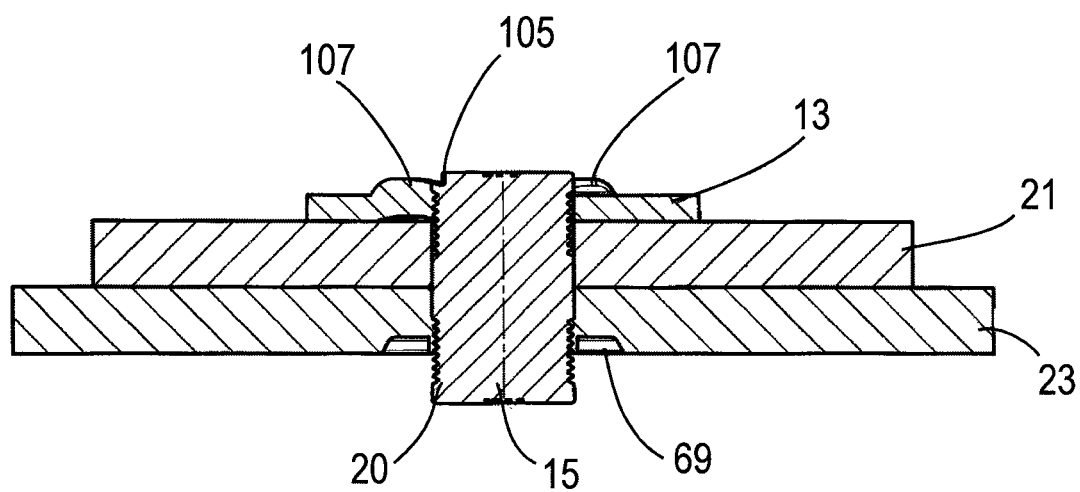
Figure 14B:
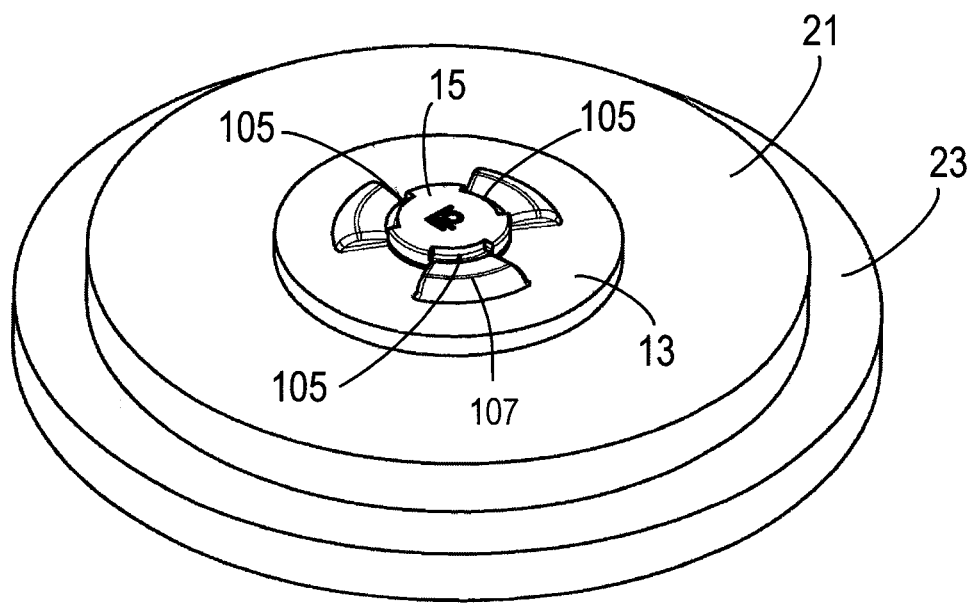
Figure 14C:
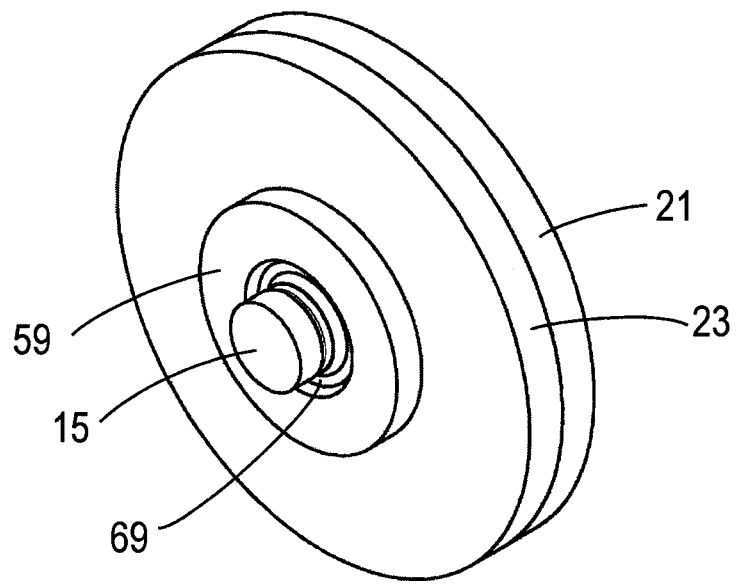
Figure 15A:
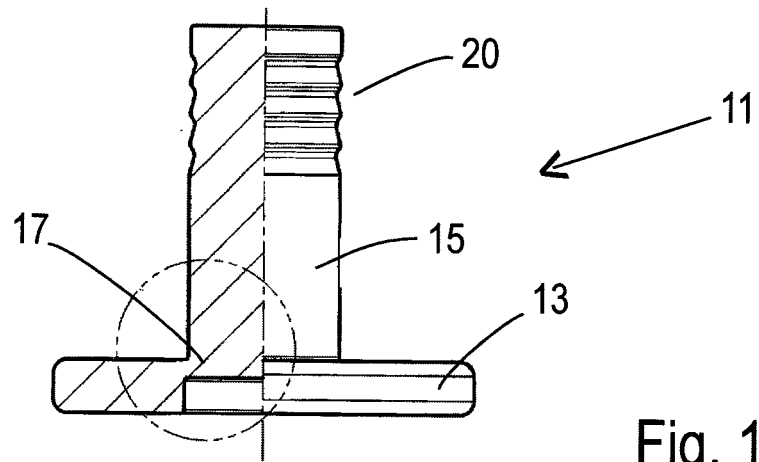
Figure 15B:
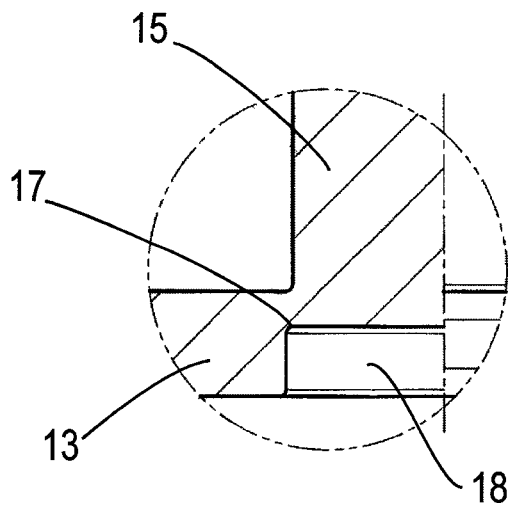
Figure 15C:
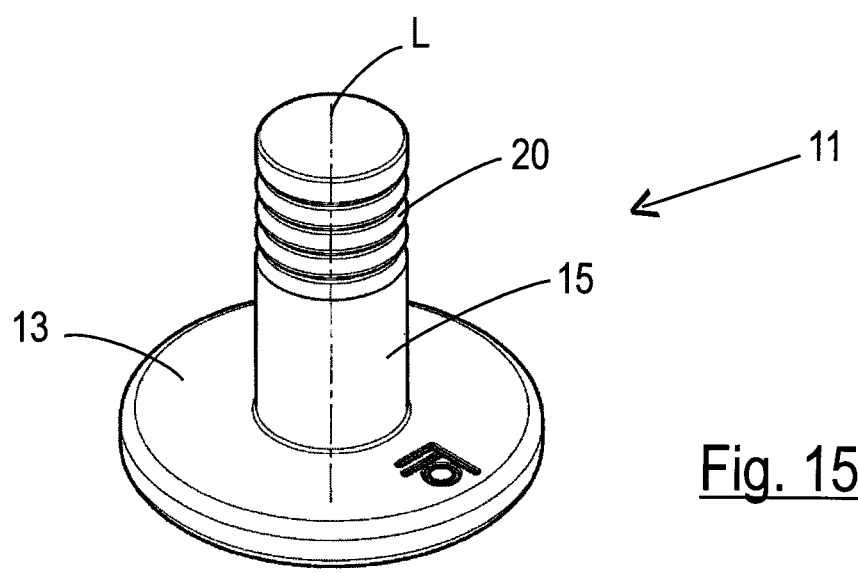

The invention will be described in the following in more detail by way of example with reference to embodiments and referring to the drawings in which are shown:

FIG. 1 a plan view of the auxiliary joining part which is used for the joining of two component in accordance with the invention, FIG. 2 a side-view of the auxiliary joining part of FIG. 1, FIG. 3 a cross-section through the auxiliary joining part which is likewise shown in FIGS. 1 and 2, FIGS. 4A to 4E various embodiments of the position of intended fracture at auxiliary joining parts, FIG. 5 a stacked arrangement prior to the carrying out of the punch riveting process with an auxiliary joining part having a plate, a first component and a second component, with at least the second (lower) component being a sheet metal part, FIG. 6 the arrangements in accordance with FIG. 4 during the punch rivet process, FIG. 7 the component assembly which arises after the conclusion of the punch rivet process, FIG. 8A the auxiliary joining part in accordance with FIGS. 1 to 3 or in accordance with FIGS. 4A to 4E in an attachment apparatus which serves for the attachment of the auxiliary joining part to two components, of which at least the lower one is formed by an organic plate and the upper one is either likewise formed by an organic plate or by a sheet metal part, while using a separate washer which is arranged in the illustration beneath the two components, FIG. 8B the finished component assembly after the attachment of the auxiliary joining part in the apparatus of FIG. 8A, FIGS. 9A to 9D various phases of the attachment of an alternative auxiliary joining part with undercuts at both ends to two components lying on top of one another which are preferably present as organic sheet metal parts, but which could also be formed by two sheet metal parts or by one sheet metal part and one organic component, FIG. 10A a component assembly resulting from the attachment process in accordance with FIGS. 9A to 9D having a disc-like plate, a further washer and with two components located between the plate and the washer, FIG. 10B an enlarged illustration of the connection of the further separate washer of FIG. 10A with one end of the auxiliary joining part, FIG. 11 a perspective illustration of the inner punch of a preferred setting head for the embossing of a pin at the upper end of the auxiliary joining part having undercuts at both ends, FIG. 12 a perspective illustration of a hold-down member which surrounds and is matched in shape to the inner punch in accordance with FIG. 11, FIGS. 13A to 13D various phases of the attachment process for an auxiliary joining part having undercuts at both ends using the internal punch and the hold-down member of FIGS. 11 and 12 respectively, FIGS. 14A and 14B the component assembly in a sectioned drawing (FIG. 14A) which results from the attachment process in accordance with FIGS. 13A to 13D and in a perspective representation (FIG. 14B) the finished component assembly in accordance with FIG. 14A seen generally obliquely from above in FIG. 14A, FIG. 14C a perspective illustration of the finished component assembly in accordance with FIG. 14A seen in generally obliquely from below in FIG. 14A, and FIGS. 15A to 15C a further alternative of an auxiliary joining part in a perspective illustration (FIG. 15A) in a detailed drawing (FIG. 15B) of the position of intended fracture of the auxiliary joining part of FIG. 15A and in FIG. 15C a view of the auxiliary joining part in accordance with FIG. 15A partly sectioned in the longitudinal direction.

The auxiliary joining part shown in FIGS. 1 to 3 has a plate 13 and a pin 15. In addition, a position of intended fracture 17 is clearly recognizable above all in FIGS. 1 and 3. A position of intended fracture 17 of the plate 13 is in this case formed as a weakened position. The position of intended fracture 17 weakens the connection of the plate 13 with the pin 15 as a result of the reduced cross-section at the position of intended fracture and through the notch action produced at the position of intended fracture 17. As a result of the weakened position the pin 15 breaks through the plate 13 as soon as a corresponding force K acts in the arrow direction shown on the end face 16 of the pin 15. The smaller the cross-section which is loaded in shear is made at the position of intended fracture, the lower is the force which needs to be expended in order to induce the punch rivet process. If the pin 13 has broken through the plate then it is moved by the continued action of force in the direction B (FIG. 5), i.e. downwardly in the longitudinal direction L in the drawings.

As can be seen in FIG. 1 the plate 13 is preferably of circular shape. Through the circular shape of the plate 13 the positioning of the auxiliary joining part 11 on the first sheet part 21 is facilitated, i.e. attention only needs to be paid to the correct alignment and positioning of the pin 15 and the orientation of the auxiliary joining part 11 around the central longitudinal axis L does not have any role to play as a result of the symmetry. The circular plate 13, which in this case is present in one piece with the pin, is, on the one hand, relatively easy to manufacture in a cold heading process. It is, however, likewise possible to make the plate in the form of a plate having corners or edges. During the cold heading process a recess 18 (FIG. 3) is formed in the region of the plate so that only little material remains in the corner region of the recess 18 whereby the position of intended fracture 17 is manufactured.

The pin 15 of the auxiliary joining part 11 can furthermore be provided with an undercut 19. In the present drawings the pin 15 is provided with at least one undercut such as 19 at the end of the pin which lies adjacent to the plate (here it is for example one undercut which is formed by four circular recesses 20). As already mentioned the pin 15 can however also have no undercuts 19 or a plurality of undercuts.

The pin 15 is preferably of cylindrical or prismatic shape. In this embodiment an advantage also results such as simple manufacture from wire material. Furthermore, a uniform and simple punching process is made possible with the aid of the pin. In addition, the manufacture is simplified and thus more economical. The formation of the possible undercuts 19 or circular recesses 20 on the surface of the pin 15 is simplified by prismatic and in particular however by a cylindrical design, since the undercut can be provided by the cold heading process but also by a rolling process.

In general the auxiliary joining part 11 consists, as shown, of a plate 13, a pin 15 and a position of intended fracture 17 introduced between them. In addition, the auxiliary joining part can have an undercut. The plate 13 and the pin 15 can, as shown in the illustrated embodiment be integrally made, with the position of intended fracture 17 in particular being formed as a weakened position with respect to the material strength or thickness. It is, however, likewise conceivable that the pin 15 is for example soldered, welded or adhesively bonded to the plate 13. The connection of the two components then forms the position of intended fracture 17. Furthermore, the pin could be fastened to the plate in a force transmitting or shape matched form, provided the force transmitting form or the shape matched form is so designed that the desired position of intended fracture 17 results. Examples for this two-part construction are shown in FIGS. 4A to E. FIG. 4A shows a soldered construction with soldered joint 30. FIG. 4B shows a design with a brazed joint 31. FIG. 4C shows a design having a few weld joints 32. FIG. 4D shows a design with an adhesively bonded connection 34 and FIG. 4E shows a design with a force transmitting and shape matched connection 35. FIG. 4E.1 shows a cross-sectional view of the auxiliary joining part 11 with a force transmitting and shape matched connection 35. FIG. 4E.2 shows a plan view of the auxiliary joining part 11. Both views are to be understood as falling under the designation of FIG. 4E. In FIG. 4E a force transmitting and shape matched connection is shown which is achieved by an interference fit. In this connection the pin end 15 has fine splines and is secured with the aid of the force fit in an opening of the plate 13. A position of intended fracture 17 arises as a result of the mechanical anchorage. In use the pin 15 can be pressed by an increased use of force through the plate 13. A design of the auxiliary joining part in two parts is, on the one hand, somewhat more complicated than an integral manufacture, but nevertheless reasonable because simple washer can be used for the plate 13 and metal bars for the pin 15.

In FIGS. 5 to 7 a method is shown which is used for the insertion of the auxiliary joining part into the components. The auxiliary joining part 11, the first component 21, the second component 23 and a die button 25 having a ring-shaped projection 28 can be seen. At this point it should be emphasized that the invention is in no way restricted to the connection of two components to one another, it can be used with more than two components, with the further components being understood as intermediate components which can optionally consists of organic components or of sheet metal parts.

As shown in FIG. 5 the auxiliary joining part 11 is held in a schematically illustrated setting head 41 which has a spring loaded, cylindrical, hold-down member 43 and a holder 45 for the pin of the auxiliary joining part. The holder 45 can for example have a ring of polyurethane 47 which presses against the pin 15 and holds it by the resulting friction within the setting head 41. Above the upper end of the pin 15 there is a plunger 49 which can be moved downwardly in order to press the pin 15 downwardly and to break the position of intended fracture 17. Such setting heads 41 are well known and are normally installed in a tool 51 of a press while the die button is supported by another tool 43 of the press. By way of example the setting head 41 can be mounted at the upper tool 51 of the press, whereas the die button 25 is carried by an intermediate platen 53 of the press or by a lower platen 55 of the press. The setting head 41 can however also be installed at the intermediate platen 53 of a press when the die button 25 is mounted at the lower platen 55 of the press. Reverse arrangements are also possible in which the setting head 41 is mounted at the lower platen 55 of the press or at an intermediate platen 53 of the press, whereas the die button 55 is then respectively carried by the intermediate platen 53 of the press or by the upper tool 51 of the press. Further constructions are also conceivable for example in an automated supply the setting head 41 can be carried by a robot which moves the setting head 41 towards a die button 25.

Furthermore, the setting head 41 and the die button 25 can be installed at the corresponding ends of a force actuated pair of tongs. By way of example, a spring 57 can act between the upper plate 51 of a press and the hold-down member 43 in order, in a first closing phase of the press, to press the plate 13 of the auxiliary joining part 11, the first component 21 and the second component 23 (and also any further components) firmly against one another and against the die button 25. During this phase the plunger 49 does not initially press against the upper end of the pin 15 of the auxiliary joining part 11. During a further closing phase of the press the spring-loaded hold-down member 43 still exerts a clamping force on the plate 13 of the auxiliary joining part 11, on the first component 21, on the second component 13 and on the die button 25 but now the upper end of the plunger 49 comes into contact with the upper tool 51 of the press or with an abutment of the setting head 41 and drives the pin 15 of the auxiliary joining part 11 downwardly, whereby the position of intended fracture 17 is broken and the end of the pin 15 which was initially adjacent the plate punches through the components and produces slugs 27 which are disposed of via the bore of the die button 25.

Through the action of force on the pin 15, for example on its upper end face 16 in the direction K, the pin 15 is separated from the plate at the position of intended fracture 17 and driven through the plate 13. Through the continued action of force the pin is punched through the first component 21 and the second component 23 (and also any further components) with slugs 27 being separated from the components. The pin 15 is driven in to such an extent that the slugs 27 fall through the bore of the die button 25 and the pin 15 is positioned, as shown in FIG. 7 essentially within the components. The slugs 27 fall into the hollow die button 25 and are subsequently led away while the second component 23 still lies firmly on the die button 25. Through the continued action of force of the press the lower component is pressed against the ring-like projection 28 of the die button whereby the component 23 is pressed in at the lower side and the sheet metal material is driven into the undercut 19. One notes that the undercut 19 or each ring of the undercut has a slightly conical flank in the press-in direction which ensures that the resisting forces during the punching movement are not excessively high whereas the following flank in the press-in direction has a substantially steeper conical shape whereby, after the shaping of the sheet metal material of the component 23 into the undercut 19, a high press-out resistance is generated. The flank following in the press-in direction could also stand perpendicular to the central longitudinal axis L.

As described in EP-A-2873473, the upper end face 16 of the pin 15 is simultaneously embossed by the plunger 49, which is shown here only purely schematically, whereby a form-fitted engagement 29 (FIG. 7) with the plate 13 is generated.

The first component 21 is fixedly riveted to the second component 23. The deformation or embossing 29 of the end face 16 of the pin 15 by the lower end of the plunger 49 of the setting head 41 takes place precisely as described in EP document EP-A-2873473.

A form-fitted connection with the plate 13 at the upper end of the pin 15 could likewise be achieved if the pin 15 also has an undercut 19 at the upper end as in FIG. 5, whereby the metallic material of the plate 13 is driven into the undercut 19. In this case the lower end face of the holder 45 would likewise be provided with a ring-like projection similar to the ring-like projection 28.

In like manner both end faces 16 can be deformed or embossed (as will later be explained in more detail) whereby a form-fitted connection of the auxiliary joining part 11 with the first component 21 and the second component 23 can be achieved by corresponding deformations or embossing 29. For this purpose, the die button 25 can be made in a similar manner to the plunger 49 in order to generate the embossing in similar manner to that described in EP-A-2873473.

With respect to the drawings of FIGS. 5 to 7 the simplified handling is above all evident since the number of individual components is kept as small as possible and thus a source of possible faults in the punch rivet process is avoided.

It is evident that the components 21 and 23 in this example are areal components at least in the region of the setting head 41, i.e. have a planar shape at least there. They can however also have a three-dimensional such as, for example, curved coachwork parts of a vehicle. The components 21 and 23 can be formed by two metallic sheet metal parts or by two organic sheet parts, i.e. plastic components with fiber or fabric reinforcement. As an alternative, they can be formed by one organic sheet part and one sheet metal part.

Furthermore, more than two components can be riveted together, with the further components optionally being metallic sheet parts and/or organic sheet parts.

In the illustrated embodiment of FIGS. 5 to 7 the first component 21 is formed as an organic sheet part and the second component 23 as a sheet metal part. That is to say, the first component 21 consists of non-metallic composite material with a fiber reinforced or fabric reinforced plastic. The second component 23 consists of a metal, from this the advantage arises above all that a metallic material has a corresponding flow property and, under the influence of a force which originates from a plunger 49 and the die button 25, can be driven into the undercut 19. For this purpose, the die button 25 has a ring-like projection 28 around the bore which forms the sheet material into the undercuts 19. This is not the only possibility of generating a form-fitted connection between the lower end of the pin 15 and the sheet metal part. It is for example also possible, as explained in the EP document EP-A-2873473 to emboss the lower end of the pin 15 such that the material overlap arises with the component 23, at least at positions, for example at three positions uniformly spaced around the central longitudinal axis L. The first component 21 which is formed as an organic sheet metal part has no corresponding flow properties. For this reason, the organic sheet part is always paired with a metal washer or the plate 13 of the auxiliary joining part in order to enable a solid riveted connection. As is evident from FIGS. 5 to 7 the plate 13 of the auxiliary joining part 11 lies on the first component 21, here an organic sheet metal part. It serves for the uniform distribution of the riveting forces onto the finished component assembly in accordance with FIG. 7. Should the first component 21 be a metallic sheet part then the provision of the plate 13 is in no way disadvantageous.

If not only the first component 21 is formed as an organic sheet part, but rather also the second component 23, then a further metal washer (not shown) is required. This is introduced in analogous manner to the plate 13, to the stacked arrangement and is received in a corresponding washer shaped recess of the die button (likewise not shown but known from EP-A-2873473) beneath the second component 23. The washer-shaped depression can then have the ring-shaped projection 28 around the bore of the die button 25 on which the washer is ultimately supported. In other words, the metal washer contacts the side of the second component 23 remote from the component 21 and is clamped firmly there under the action of the spring-loaded hold-down member 43. In this way the first component 21 and the second component 23 are firmly clamped between the plate 13 and the metal washer. The metal washer acts as a load distributor with organic sheet parts so that the high riveting forces are uniformly taken up without damaging the organic sheet part. When a metal washer is provided the metallic material of the metal washer is likewise driven by the ring-like projection 28 of the die button into the undercuts 19, or the end face 16 of the pin 15 is, as described above—in accordance with the instructions in EP document EP-A-2873473—embossed. In this way a form-fitted connection can be achieved also when a first organic sheet part 21 and a second organic sheet part 23 are present.

It is likewise conceivable that both the first component 21 and also the second component 23 are formed as metallic sheet metal parts. In this case a further metal washer is not necessary because the material of the sheet metal part itself has a corresponding flow characteristic.

Ultimately it should be brought out that a spring-loaded hold-down member 43 is not absolutely essential when using the auxiliary joining part 11 in accordance with the invention because the forces which are required in order to break the position of intended fracture 17 likewise exert a clamping force on the plate 13, the components 21 and 23 and on a washer received in the die button (as likewise described in EP-A-2873473) and it is possible that the friction forces exerted by the plunger on the plate during the piercing of the components is sufficient in order to avoid fraying out of any organic sheet parts that are present.

The auxiliary joining parts can also consist of all materials which are customary for punched rivets.

Some further examples of the invention will now be described and in this further description parts which have the same design or function as previously described parts are provided with the same reference numerals and it will be understood that the previous description likewise applies to the further examples, providing the same reference numerals are used and providing nothing is stated in contrary. For this reason, the previous description will not be unnecessarily repeated.

Referring now to FIGS. 8A and 8B an arrangement is now shown in which a washer 59 is provided at the lower side of the stacked components 21, 23 and fits into a recess 61 of a die button 25 and sits, in the open state of the press or the like, on the ring nose or ring-like rejection 28 provided there. As previously the ring-like projection surrounds an opening 63 of the die button through which and through the passage 25 which follows the opening 63, the piercing slugs 27 can be disposed of after the closing of the press and the punching through of the components 21, 23.

In this arrangement the lower component 23 is normally formed as an organic sheet part. This is however not essential if, for example, the lower component consists of a soft sheet metal part, the connection of which with the pin would be weak, then it could be appropriate to use a metal washer 59 which, on the one hand, enables a firm connection with the lower end of the pin 15 and, on the other hand, exerts a load distributing function at the component 23.

FIG. 8B shows then the resulting component assembly 67 after closing of the press, after piercing of the components 21, 23 and the embossing of the upper end of the pin and of the material of a further washer 59 into the undercut 19 at the lower end of the pin 15.

One can see from FIG. 8B that the further washer 59 has a ring-shaped impression 69 which was generated by the ring-like projection 28 of the die button 25, whereby the so displaced material of the washer 59 has brought about the form-fitted engagement with the undercut 19 or with its circular recesses 20. The embossed connection of the upper end of the pin 15 with the plate 13 is realized in precisely the same manner as previously described.

FIGS. 9A to 9D now show an alternative design of the auxiliary joining part 11 with premanufactured undercuts 19 at its two ends. Here, in analogous manner to the embodiment of FIG. 8A, a further washer 59 is also used which also sits here in a recess 61 of the die button 25 on the ring-shape projection 28. The various phases of the attachment process can be straightforwardly seen from the sequence of drawings 9A to 9D with the aid of the previous description and reference numerals that are used. One can see from the FIGS. 10A and 10B, which show the component assembly 67, that the attachment of the further washer 59 to the lower end of the pin 15 of the auxiliary joining part 11 has taken place in just the same manner as was described in connection with FIG. 8A. The attachment of the plate 13 to the upper end of the pin 15 however takes place here analogously to the attachment of the further washer 59 with the lower end of the pin by the generation of a ring recess or impression 69 in the plate around the upper end of the pin 15, whereby plate material is forced into the upper undercut 19. I.e. FIG. 10B can, when turned through 180 degrees, be understood to represent the attachment of the plate to the adjacent end of the pin 15. This signifies that the outer plunger 73 of the setting head which surrounds the inner plunger 71 has a ring nose 75 corresponding to the ring-like projection 28 in order to bring about the ring-shaped indentation 77 of the upper side of the plate 15. In this embodiment the inner plunger 73 presses against the upper end face of the pin 15 in order to drive this through the components. The corresponding tool of the press then first presses on the upper end face of the outer plunger 73 at the end of the closing phase of the press after the movement of the inner plunger in longitudinal direction L, at approximately the same point in time as the ring-like projection 28 of the die button 25 serves for the indentation of the disc 59.

Instead of operating with a ring-like projection 28 and with a ring nose 75 it could also be sufficient to operate with discrete projections or noses which are arranged in a ring because, depending on the material, an adequate engagement material of the so embossed part could be achieved, be it of the further washer 59 or of the plate 13 into the respective undercuts 19.

A particularly preferred embodiment of the inner plunger 73 and of the outer plunger 71 which are used for a discrete embossing of the plate 13 at three points is shown in FIGS.

11 and 12. The outer plunger 71 has a cylindrical body 79 with three flats 81 which serve for the guidance of the body within the setting head 41 at the correct angle around the central longitudinal axis L. The outer plunger 71 has an inner passage 83 directed in the longitudinal direction L with an approximately cloverleaf-like cross-section, the individual "leaves" of which are matched in shape to three tongues 87 of the inner plunger 73 and receive these in a mutually displaceable manner. The outer plunger 71 has at its upper end a cylindrical collar 89 which restricts the position of the outer plunger 71 in the setting head 41 or in the corresponding tool of the press. The inner plunger 73 likewise has a collar 91 at its upper end which restricts the displacement part of the inner plunger 73 within the outer plunger 71 in the longitudinal direction L in that the collar 91 contacts the upper side of the collar 89 at the end of the displacement. One sees from FIG. 11 that the inner plunger has a central opening 93 the base of which as shown in FIGS. 13A to 13D is in engagement with or presses against the upper end face of the pin 15 of the auxiliary joining part. One can see further that the free lower ends 95 of the tongues 85 merge via a dish 96 into the central recess 93. The precise form can be seen from FIG. 11. It should be mentioned that the outer plunger 71 has a non-visible cylindrical bore above the cloverleaf-like passage 83 in which the cylindrical portion 97 of the inner plunger is displaceable. Furthermore, a recess 99 of ring-shape in plan view is evident in FIG. 12 which receives the plate 13 in a manner flush with the lower end face of the outer plunger 71 as can be seen from the FIGS. 13A to 13D. The base of the recess 93 is set back by the same amount as the upper end of the pin 15 projects beyond the plate 13 in the installed state.

FIGS. 13A to 13D now shows various phases of the attachment of an auxiliary joining part 11 with undercuts at the upper and lower ends of the pin 15 by means of a setting head 41 which is equipped with the inner plunger 73 and the outer plunger 71 of the FIGS. 11 and 12. The representations of the setting head 41 in FIGS. 13A to 13D have arisen from a CAD drawing and are somewhat misleading unless one takes account of the description of FIGS. 11 and 12 and in addition recognizes that FIGS. 13A to 13D only show the inter-engaging lower parts of the outer plunger 71 and of the inner plunger 73, where the three tongues 87 are displaceably guided within the cloverleaf-like passage 83, i.e. significantly below a cylindrical region 97 of the inner plunger 73. The outer plunger 71 is to be understood here as the hold-down member which can be seen from the drawings of FIGS. 13A to 13D.

If one now considers the sectional drawing of FIG. 13A then one can see that the outer plunger in the left-hand side of the drawing directly lies against the pin 15 of the auxiliary joining part, i.e. the section plane corresponds to the plane S-S in FIG. 12. To the right of pin 15 of the auxiliary joining part 11 there is a free space 101 shown with vertical lines. This free space is a section on the section plane S-S of FIG. 12 through a "leaf" 85 of the cloverleaf-like passage 83 of the outer plunger. The vertical lines arise from the CAD drawing and represent lines at radii of the so-called leaf. Above this free space 101 one can see a tongue 87 of the inner plunger 73. The section shown through the inner plunger 73 corresponds to the section plane T-T in FIG. 11.

One can see from FIG. 13A two schematically illustrated coil springs 57 which bias the outer plunger 71 downwardly so that, in the initial closing process of the press, i.e. in the state of FIG. 13B, the outer plunger 71 presses the two components 21, 23 against one another with spring force and against the ring-like projection or ring nose 28 of the die button 25. The spring force determines the lever of the preload force. As a rule, a plurality of springs are arranged around the central longitudinal axis L. They could also be replaced by hydraulic or pneumatic preload springs.

The die button 25 is, in this example, also made in two parts with an outer sprung cylinder 26 and an inner fixed cylinder 35 with a ring-like projection or ring nose 28. The outer cylinder 26 cooperates with the hold-down member 43 in order to preload the components under spring pressure. In the closed position of the press as shown in FIGS. 13C and 13D the outer cylinder moves downwardly and the ring nose 28 which now projects above the upper end face of the outer cylinder 26 generates a ring recess in the lower component, whereby sheet material of the lower component 23 flows into the lower circular recesses 20 of the pin 15 and leads to a form-fitted connection.

In a further closing phase of the press which is finished in FIG. 13D the inner plunger has been downwardly pressed by the press. The pin 15 is separated at the position of intended fracture of plate 13 and punches through the two components 21, 23 and generates the punch slugs 27. At the end of this closing movement the three arms 103 of the dish of the inner plunger 73 scrape material away from the periphery of the pin 15 at three positions such as 105 and this material forms three raised portions 107 at the upper side of the plate 13 and displaces moreover the material of the plate 13 into the circular recesses 20 of the pin 15. The parts of the arms 103 of the dish 96 radially outside of the pin 15 bound the shape of the raised portions 107, which consist of the scraped away material, and ensure that the compressive stress in the plate 13 causes the plate material to flow into the ring recesses 20.

The free ends of the tongues 87 press at the upper side of the plate 13 which is bounded on all sides and thus can only deform in the manner described. One can see at the position 105 that a corner region of the pin 15 has been pressed in. The other two positions 105 cannot be seen in the drawings of FIGS. 13C and 13D because they lie outside of the section plane. They are, however, evident in FIG. 14B. FIG. 13D now shows the finished state after the piercing slugs 27 have fallen away prior to the opening of the press. The finished component assembly is shown in section in FIG. 14A and in a corresponding perspective illustration from above in FIG. 14D.

In the example of FIGS. 13A to 13D and FIGS. 14A and 14B the lower component is a metallic component which is why one is not operating with a separate washer here. The upper component 21 can either be an organic component or a metallic sheet metal part.

If the lower component 23 is an organic component then one can operate with a washer in die button 25 in analogy to the illustrations of FIGS. 9A to 9D, 10A and 10B.

Although in the illustration of FIGS. 13A and 13D and 14A and 14B the pin 15 of the auxiliary joining part 11 is provided with circular recesses 20 at both ends threads can be used instead of circular recesses. This also applies to all other embodiments with circular recesses 20. It has been found that even if one dispenses with ring recesses or any other form of undercut at the top end of the pin 15, i.e. operates with a purely cylindrical pin, that the raised portions of material or lugs 107 are sufficient to achieve a particularly firm connection or riveted joint.

Finally, reference is made to FIGS. 15A to 15C. here a different embodiment of an auxiliary joining part 11 is shown in which the circular recesses 20 are provided at the pin 15 at the top whereas no circular recesses are provided adjacent to the position of intended fracture 17 and to the plate 13. The auxiliary joining part according to FIGS. 15A to 15C can be processed with a setting head analogous to that shown in FIGS. 13A to 13D.

The die button must however be so designed that the lower, recess-free, end of the pin is deformed solely by a ring-like embossing, or by embossing at local positions, so that the embossed material comes to lie below the lower component 23, if this is a metallic sheet metal part, or comes to lie beneath a washer if the lower component 23 is an organic component. This could take place in such a way that the die button 25 is designed as a reversed version of the setting head 41 of FIGS. 13A to 13D. The extent of the deviation downwardly of the outer cylinder 26 relative to the inner cylinder 35 of the die button could theoretically be made substantially smaller than the stroke of the inner plunger 73 of the setting head 41 relative to the outer plunger 71 since the die button now only has to emboss the lower end of the pin 15 and does not have to serve for the punching through of the components 21, 23. However, it is necessary for the die button to be designed such that the punched slugs 27 can be disposed of through the die button prior to the embossing of the lower end of the pin. To achieve this it is appropriate, in accordance with the invention, to increase the stroke of the inner cylinder 35 of the die button to permit the creation of a transverse passage extending from the bore of the outer cylinder 26 of the die button through the side wall of the outer cylinder 26 while the inner cylinder 35 is in a lowered position. In addition the bore of the outer cylinder needs to be large enough to allow free passage of the slugs down to and through the transverse bore. Since the inner cylinder has to emboss the lower end of the pin 15 it needs to have an inner diameter smaller than that of the pin 15 and an outer diameter such that it can be adequately guided within the outer cylinder 26.

It is also conceivable to use an auxiliary joining part 11 with a pin 15 without any undercuts, circular recesses or threads if the setting head is designed as described in the FIGS. 13A to 13D and if the die button is designed as outlined in the previous paragraph. Other designs of the setting head 41 and the die button 25 can also be considered when a cylindrical pin is used so long as it is designed in order to form a form-fitted connection with the plate 13 or with a further washer or with the lowermost component.

When designations such as top and bottom or similar geometric expressions are used in this application then this is always related to the orientation of the drawings and should not be understood as a geometric restriction.

REFERENCE NUMERAL LIST 11 auxiliary joining part
13 plate
15 pin
16 end face
17 position of intended fracture
18 recess
19 undercut
20 circular recesses at the pin 15
21 first component
23 second component
25 die button
26 outer cylinder of the die button 25
27 slug
28 ring-like projection
29 deformation/embossing
30 solder joint
31 brazed joint
32 welded positions
33 adhesive joint
34 force transmitting and form-fitted connection
35 inner cylinder of the die button 25
41 setting head
43 hold-down member
45 holder
47 ring
49 plunger
51 upper platen/tool of the press
53 intermediate platen/tool of the press
55 lower platen/tool of the press
57 spring
59 washer
61 recess of the die button 25
63 opening of the die button 25
65 passage of the die button 25
67 component assembly
69 indentation
71 outer plunger of the setting head 41, hold down member
73 inner plunger of the setting head 41
75 ring nose of the outer plunger 71
77 indentation of the plate 13
79 cylindrical body of the outer plunger 71
81 flats of the cylindrical body 79
83 cloverleaf-like passage of the outer plunger
85 leaves of the cloverleaf-like passage of the outer plunger 71
87 tongues of the inner plunger 73
89 collar of the outer plunger 71
91 collar of the inner plunger 73
93 recess of the inner plunger 73
95 free ends of the tongues 87
96 dish
97 cylindrical sections of the inner plunger
99 end recess of the outer plunger
101 free space
103 arms of the dish 96
105 position, pressed-in corner region of the pin 15
107 raised portions at the upper side of the plate 13, lugs
B direction of movement of the pin
K action of force
L central longitudinal axis
S-S sectional plane
T-T sectional plane

The invention claimed is:

1. A component assembly comprising:
an auxiliary joining part including a solid pin (15) having a front end initially fixed to a plate (13) and a tail end initially being remote from the plate (13), with a position of intended fracture (17) present between the plate (13) and the front end of the solid pin (15),
a first component (21); and
a second component (23),
the first component (21), the second component (23) and the plate (13) being in a stacked arrangement, such that the plate (13) contacts the first component (21), wherein at least one of the front end of the solid pin (15) is fractured and separated from the plate (13) at the position of intended fracture (17) and pressed through the second component (23), the second component (23) and a washer (59) which is optionally provided at the second component (23) at a side of the second component (23) remote from the first component (21), is deformed thus providing a form-locked connection between the front end of the solid pin (15) and the second component (23) and the solid pin (15) and the washer (59) if provided, and at least one of the plate (13) and the tail end of the solid pin (15) is deformed thus providing a form-fitted connection between the plate (13) and the tail end of the solid pin (15).

2. The component assembly of claim 1, wherein the pin (15) is solid along a central longitudinal axis (L).

3. The component assembly of claim 1, wherein the form-fitted connection between the plate (13) and the tail end of the pin (15) fixes separated material of the pin (15) and the plate (13) together.

4. The component assembly of claim 1, wherein the pin (15) has at least one annular undercut (19) adjacent the front end of the pin (15).

5. The component assembly of claim 4, wherein the form-locked connection between the pin (15) and the second component (23) is formed by material of the second component (23) extending into the at least one annular undercut (19).

6. The component assembly of claim 5, wherein the at least one annular undercut (19) includes a plurality of annular undercuts (19).

7. The component assembly of claim 4, wherein the pin (15) has at least one annular undercut (19) adjacent the tail end of the pin (15).

8. The component assembly of claim 1, wherein the front end of the pin (15) which is fractured and separated from the plate (13) is closed.

\* \* \* \* \*